US008156074B1

(12) United States Patent
Multer et al.

(10) Patent No.: US 8,156,074 B1
(45) Date of Patent: Apr. 10, 2012

(54) DATA TRANSFER AND SYNCHRONIZATION SYSTEM

(75) Inventors: David L. Multer, Santa Cruz, CA (US); Robert E. Garner, Lawrenceville, GA (US); Leighton A. Ridgard, Ellenwood, GA (US); Liam J. Stannard, Lawrenceville, GA (US); Donald W. Cash, Dunwoody, GA (US); Richard M. Onyon, San Jose, CA (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 1826 days.

(21) Appl. No.: 09/491,675

(22) Filed: Jan. 26, 2000

(51) Int. Cl.
*G06F 7/00* (2006.01)

(52) U.S. Cl. .................................. 707/610; 707/749

(58) Field of Classification Search ............... 705/9; 707/200–205, 1–10, 3.1, 100–104.1, 610, 707/749; 709/223, 254, 228, 248
See application file for complete search history.

(56) References Cited

U.S. PATENT DOCUMENTS

| | | | |
|---|---|---|---|
| 4,887,212 A | 12/1989 | Zamora et al. ............. | 364/419 |
| 5,111,398 A | 5/1992 | Nunberg et al. ............ | 364/419 |
| 5,115,466 A | 5/1992 | Presttun | |
| 5,130,993 A | 7/1992 | Gutman et al. | |
| 5,146,221 A | 9/1992 | Whiting et al. .............. | 341/67 |
| 5,329,619 A | 7/1994 | Page et al. ................. | 395/200 |
| 5,392,390 A | 2/1995 | Crozier ..................... | 395/161 |
| 5,418,854 A | 5/1995 | Kaufman et al. ........... | 713/156 |
| 5,418,908 A | 5/1995 | Keller et al. ............... | 395/200 |
| 5,425,079 A | 6/1995 | Noda et al. | |
| 5,483,352 A | 1/1996 | Fukuyama ................. | 358/402 |
| 5,485,161 A | 1/1996 | Vaughn ................. | 342/357.13 |
| 5,519,433 A | 5/1996 | Lappington et al. ........ | 725/110 |
| 5,519,606 A | 5/1996 | Frid-Nielsen et al. ...... | 364/401 |
| 5,543,789 A | 8/1996 | Behr et al. ................. | 340/995 |
| 5,544,061 A | 8/1996 | Morimoto et al. .......... | 340/995 |
| 5,561,446 A | 10/1996 | Montlick ................... | 345/173 |
| 5,574,906 A | 11/1996 | Morris ....................... | 395/601 |
| 5,579,489 A | 11/1996 | Dornier et al. | |

(Continued)

FOREIGN PATENT DOCUMENTS

CN 1998-106683 4/1998

(Continued)

OTHER PUBLICATIONS

Response to Non-Final Office Action dated Dec. 14, 2007, U.S. Appl. No. 10/659,646, filed Sep. 10, 2003.

(Continued)

*Primary Examiner* — Shahid Alam
(74) *Attorney, Agent, or Firm* — Haverstock & Owens LLP

(57) ABSTRACT

A data transmission system and method which optimizes transfer and updates of information between systems by providing difference information between the systems is disclosed. A system includes a differencing transmitter transmitting at least one set of difference transactions and a differencing receiver receiving said at least one set of difference transactions A method for synchronizing at least a first file and a second file resident on a first and a second systems, respectively, is provided. The method comprises the steps of: determining difference data resulting from changes to a first file on the first system; transmitting the difference information to a second system; applying the difference information to generate change data for the second file; and updating the second file on the second system with the difference data.

11 Claims, 13 Drawing Sheets

U.S. PATENT DOCUMENTS

| | | | |
|---|---|---|---|
| 5,588,009 A | 12/1996 | Will | 371/33 |
| 5,592,470 A | 1/1997 | Rudrapatna et al. | |
| 5,623,406 A | 4/1997 | Ichibah | 364/999.999 |
| 5,623,661 A | 4/1997 | Hon | |
| 5,628,005 A | 5/1997 | Hurvig | 395/608 |
| 5,630,081 A | 5/1997 | Rybicki et al. | 395/348 |
| 5,638,508 A | 6/1997 | Kanai et al. | |
| 5,640,577 A | 6/1997 | Scharmer | 395/765 |
| 5,644,709 A | 7/1997 | Austin | |
| 5,647,002 A | 7/1997 | Brunson | |
| 5,649,195 A | 7/1997 | Scott et al. | |
| 5,650,800 A | 7/1997 | Benson | |
| 5,666,397 A | 9/1997 | Lamons et al. | |
| 5,666,553 A | 9/1997 | Crozier | 395/803 |
| 5,682,524 A | 10/1997 | Freund et al. | 395/605 |
| 5,684,990 A | 11/1997 | Boothby | 395/619 |
| 5,694,596 A | 12/1997 | Campbell | 395/610 |
| 5,699,255 A | 12/1997 | Ellis et al. | 701/212 |
| 5,701,423 A | 12/1997 | Crozier | 395/335 |
| 5,706,509 A | 1/1998 | Man-Hak Tso | 395/617 |
| 5,710,922 A * | 1/1998 | Alley et al. | 707/201 |
| 5,727,202 A | 3/1998 | Kucala | 395/610 |
| 5,727,950 A | 3/1998 | Cook et al. | 434/350 |
| 5,729,735 A | 3/1998 | Meyering | |
| 5,729,739 A | 3/1998 | Cantin et al. | 395/614 |
| 5,729,743 A | 3/1998 | Squibb | 395/619 |
| 5,742,792 A | 4/1998 | Yanai et al. | 395/489 |
| 5,745,750 A | 4/1998 | Porcaro | |
| 5,745,906 A | 4/1998 | Squibb | 707/203 |
| 5,757,920 A | 5/1998 | Misra et al. | 380/25 |
| 5,758,150 A | 5/1998 | Bell et al. | |
| 5,758,355 A | 5/1998 | Buchanan | 707/201 |
| 5,764,899 A | 6/1998 | Eggleston et al. | 709/203 |
| 5,768,480 A | 6/1998 | Crawford, Jr. et al. | |
| 5,768,597 A | 6/1998 | Simm | 395/712 |
| 5,771,354 A | 6/1998 | Crawford | 395/200.59 |
| 5,778,346 A | 7/1998 | Frid-Nielsen et al. | 705/9 |
| 5,778,361 A | 7/1998 | Nanjo et al. | 707/500 |
| 5,778,367 A | 7/1998 | Wesinger et al. | 395/10 |
| 5,778,388 A | 7/1998 | Kawamura et al. | |
| 5,781,901 A | 7/1998 | Kuzma | 707/10 |
| 5,787,247 A | 7/1998 | Norin et al. | 395/200.5 |
| 5,787,262 A | 7/1998 | Shakib et al. | 395/200.35 |
| 5,794,228 A | 8/1998 | French et al. | 707/2 |
| 5,804,803 A | 9/1998 | Cragun et al. | 235/375 |
| 5,809,497 A | 9/1998 | Freund et al. | 707/2 |
| 5,812,773 A | 9/1998 | Norin | 395/200.34 |
| 5,812,793 A | 9/1998 | Shakib et al. | 395/200.31 |
| 5,818,437 A | 10/1998 | Grover et al. | 345/811 |
| 5,826,245 A | 10/1998 | Sandberg-Diment | 705/44 |
| 5,832,489 A | 11/1998 | Kucala | 707/10 |
| 5,832,518 A | 11/1998 | Mastors | |
| 5,832,519 A | 11/1998 | Bowen et al. | |
| 5,832,520 A | 11/1998 | Miller | |
| 5,845,283 A | 12/1998 | Williams et al. | |
| 5,859,973 A | 1/1999 | Carpenter | 395/200.33 |
| 5,864,864 A | 1/1999 | Lerner | |
| 5,875,296 A | 2/1999 | Shi et al. | |
| 5,884,323 A | 3/1999 | Hawkins et al. | 707/201 |
| 5,884,325 A | 3/1999 | Bauer et al. | 707/201 |
| 5,893,119 A | 4/1999 | Squibb | 707/203 |
| 5,896,321 A | 4/1999 | Miller | 365/189.01 |
| 5,897,640 A | 4/1999 | Veghte et al. | 707/202 |
| 5,897,642 A | 4/1999 | Capossela et al. | |
| 5,903,723 A | 5/1999 | Beck et al. | 709/203 |
| 5,907,793 A | 5/1999 | Reams | 455/3.1 |
| 5,923,756 A | 7/1999 | Shambroom | 713/156 |
| 5,923,848 A | 7/1999 | Goodhand et al. | 395/200.4 |
| 5,926,816 A | 7/1999 | Bauer et al. | 707/8 |
| 5,933,653 A | 8/1999 | Ofek | 395/826 |
| 5,933,778 A | 8/1999 | Buhrmann et al. | |
| 5,933,816 A | 8/1999 | Zeanah et al. | 705/35 |
| 5,935,262 A | 8/1999 | Barrett et al. | |
| 5,937,405 A | 8/1999 | Campbell | 707/10 |
| 5,941,944 A | 8/1999 | Messerly | 709/203 |
| 5,943,676 A | 8/1999 | Boothby | 707/201 |
| 5,944,787 A | 8/1999 | Zoken | 709/206 |
| 5,946,615 A | 8/1999 | Holmes et al. | 455/412 |
| 5,948,066 A | 9/1999 | Whalen et al. | 709/229 |
| 5,951,636 A | 9/1999 | Zerber | 709/202 |
| 5,961,572 A | 10/1999 | Craport et al. | 340/990 |
| 5,961,590 A | 10/1999 | Mendez et al. | 709/206 |
| 5,968,131 A | 10/1999 | Mendez et al. | 709/246 |
| 5,970,149 A | 10/1999 | Johnson | 714/46 |
| 5,970,490 A | 10/1999 | Morgenstern | 707/10 |
| 5,971,277 A | 10/1999 | Cragun et al. | 235/462.01 |
| 5,974,238 A | 10/1999 | Chase, Jr. | 395/200.78 |
| 5,974,563 A | 10/1999 | Beeler, Jr. | |
| 5,987,381 A | 11/1999 | Oshizawa | 340/990 |
| 5,987,609 A | 11/1999 | Hasebe | 726/35 |
| 5,995,118 A | 11/1999 | Masuda | 345/467 |
| 6,000,000 A | 12/1999 | Hawkins et al. | 707/201 |
| 6,006,215 A | 12/1999 | Retallick | 707/2 |
| 6,006,274 A | 12/1999 | Hawkins et al. | 709/248 |
| 6,009,462 A | 12/1999 | Birrell et al. | 709/206 |
| 6,012,063 A | 1/2000 | Bodnar | 707/101 |
| 6,012,088 A | 1/2000 | Li et al. | 709/219 |
| 6,014,695 A | 1/2000 | Yamashita et al. | 709/219 |
| 6,016,394 A | 1/2000 | Walker | 717/104 |
| 6,016,478 A | 1/2000 | Zhang et al. | 705/9 |
| 6,023,708 A | 2/2000 | Mendez et al. | 707/203 |
| 6,023,723 A | 2/2000 | McCormick et al. | 709/206 |
| 6,026,414 A | 2/2000 | Anglin | 707/204 |
| 6,034,621 A | 3/2000 | Kaufman | |
| 6,038,665 A | 3/2000 | Bolt et al. | 713/176 |
| 6,044,381 A * | 3/2000 | Boothby et al. | 707/201 |
| 6,049,776 A | 4/2000 | Donnelly et al. | 705/8 |
| 6,052,735 A | 4/2000 | Ulrich et al. | 709/236 |
| 6,058,399 A | 5/2000 | Morag et al. | |
| 6,061,790 A | 5/2000 | Bodnar | 713/171 |
| 6,061,796 A | 5/2000 | Chen et al. | 713/201 |
| 6,063,134 A | 5/2000 | Peters et al. | |
| 6,064,880 A | 5/2000 | Alanara | 455/419 |
| 6,065,018 A | 5/2000 | Beier et al. | |
| 6,073,133 A | 6/2000 | Chrabaszcz | 707/10 |
| 6,076,109 A | 6/2000 | Kikinis | 709/228 |
| 6,078,960 A | 6/2000 | Ballard | 709/229 |
| 6,081,900 A | 6/2000 | Subramaniam et al. | 713/200 |
| 6,094,618 A | 7/2000 | Harada | 701/207 |
| 6,101,480 A | 8/2000 | Conmy et al. | 705/9 |
| 6,108,330 A | 8/2000 | Bhatia et al. | 370/352 |
| 6,108,703 A | 8/2000 | Leighton et al. | 709/226 |
| 6,112,024 A | 8/2000 | Almond et al. | |
| 6,115,797 A | 9/2000 | Kanda et al. | |
| 6,131,096 A | 10/2000 | Ng et al. | 707/10 |
| 6,131,116 A | 10/2000 | Riggins et al. | 709/219 |
| 6,141,011 A | 10/2000 | Bodnar et al. | 345/357 |
| 6,141,621 A | 10/2000 | Piwowarski et al. | 340/989 |
| 6,141,659 A | 10/2000 | Barker et al. | 707/102 |
| 6,141,664 A | 10/2000 | Boothby | 707/201 |
| 6,145,088 A | 11/2000 | Stevens | |
| 6,148,260 A | 11/2000 | Musk et al. | 701/200 |
| 6,151,606 A | 11/2000 | Mendez | 707/201 |
| 6,157,630 A | 12/2000 | Adler et al. | 370/310 |
| 6,163,773 A | 12/2000 | Kishi | 706/16 |
| 6,163,779 A | 12/2000 | Mantha et al. | 707/100 |
| 6,163,844 A | 12/2000 | Duncan et al. | 713/201 |
| 6,167,120 A | 12/2000 | Kikinis | 379/90.01 |
| 6,173,310 B1 | 1/2001 | Yost et al. | 709/201 |
| 6,173,311 B1 | 1/2001 | Hassett et al. | 709/202 |
| 6,182,117 B1 | 1/2001 | Christie et al. | 709/205 |
| 6,182,141 B1 | 1/2001 | Blum et al. | 709/227 |
| 6,185,598 B1 | 2/2001 | Farber et al. | 709/200 |
| 6,189,030 B1 | 2/2001 | Kirsch et al. | 709/224 |
| 6,189,096 B1 | 2/2001 | Haverty | 713/155 |
| 6,195,695 B1 | 2/2001 | Cheston et al. | 709/221 |
| 6,195,794 B1 | 2/2001 | Buxton | 717/11 |
| 6,202,085 B1 | 3/2001 | Benson et al. | 709/205 |
| 6,205,448 B1 | 3/2001 | Kruglikov et al. | 707/200 |
| 6,209,034 B1 | 3/2001 | Gladwin et al. | |
| 6,212,529 B1 | 4/2001 | Boothby et al. | 707/201 |
| 6,212,556 B1 | 4/2001 | Arunachalam | |
| 6,216,131 B1 | 4/2001 | Liu et al. | 707/102 |
| 6,219,680 B1 | 4/2001 | Bernardo et al. | 707/501 |
| 6,219,694 B1 | 4/2001 | Lazaridis et al. | 709/206 |
| 6,223,187 B1 | 4/2001 | Boothby et al. | 707/201 |
| 6,226,650 B1 | 5/2001 | Mahajan et al. | 707/201 |

| Patent | Kind | Date | Inventor | Class |
|---|---|---|---|---|
| 6,233,565 | B1 | 5/2001 | Lewis et al. | 705/35 |
| 6,233,589 | B1 | 5/2001 | Balcha et al. | |
| 6,243,760 | B1 | 6/2001 | Armbruster et al. | 709/243 |
| 6,247,048 | B1 | 6/2001 | Greer et al. | 709/219 |
| 6,247,135 | B1 | 6/2001 | Feague | 713/400 |
| 6,249,690 | B1 | 6/2001 | Mashiko | |
| 6,252,547 | B1 | 6/2001 | Perry et al. | 342/357.06 |
| 6,255,989 | B1 | 7/2001 | Munson et al. | 342/357.13 |
| 6,256,750 | B1 | 7/2001 | Takeda | 714/11 |
| 6,260,124 | B1 | 7/2001 | Crockett et al. | 711/162 |
| 6,272,545 | B1 | 8/2001 | Flanagin et al. | |
| 6,275,831 | B1 | 8/2001 | Bodnar et al. | 707/201 |
| 6,278,941 | B1 | 8/2001 | Yokoyama | 701/209 |
| 6,282,435 | B1 | 8/2001 | Wagner et al. | 455/566 |
| 6,282,698 | B1 | 8/2001 | Baker et al. | |
| 6,285,889 | B1 | 9/2001 | Nykanen et al. | 455/557 |
| 6,286,029 | B1 | 9/2001 | Delph | |
| 6,286,053 | B1 | 9/2001 | Van Peursem et al. | 709/999.999 |
| 6,286,085 | B1 | 9/2001 | Jouenne et al. | 711/162 |
| 6,289,212 | B1 | 9/2001 | Stein et al. | |
| 6,292,743 | B1 | 9/2001 | Pu et al. | 455/456 |
| 6,292,905 | B1 | 9/2001 | Wallach et al. | 714/4 |
| 6,295,502 | B1 | 9/2001 | Hancock et al. | 701/201 |
| 6,295,541 | B1 * | 9/2001 | Bodnar et al. | 707/203 |
| 6,304,881 | B1 | 10/2001 | Halim et al. | 707/201 |
| 6,317,755 | B1 | 11/2001 | Rakers et al. | |
| 6,321,236 | B1 | 11/2001 | Zollinger et al. | 707/201 |
| 6,324,467 | B1 | 11/2001 | Machii et al. | 701/200 |
| 6,324,526 | B1 | 11/2001 | D'Agostino | 705/44 |
| 6,324,544 | B1 | 11/2001 | Alam et al. | |
| 6,327,533 | B1 | 12/2001 | Chou | 340/988 |
| 6,329,680 | B1 | 12/2001 | Yoshida et al. | 257/296 |
| 6,330,568 | B1 | 12/2001 | Boothby et al. | 707/201 |
| 6,332,158 | B1 | 12/2001 | Risley et al. | 709/219 |
| 6,333,973 | B1 | 12/2001 | Smith et al. | 379/88.12 |
| 6,338,096 | B1 | 1/2002 | Ukelson | 719/319 |
| 6,339,710 | B1 | 1/2002 | Suzuki | 455/458 |
| 6,341,316 | B1 | 1/2002 | Kloba et al. | 709/248 |
| 6,345,308 | B1 | 2/2002 | Abe | 709/248 |
| 6,349,336 | B1 | 2/2002 | Sit et al. | |
| 6,353,448 | B1 | 3/2002 | Scarborough et al. | 345/349 |
| 6,356,910 | B1 | 3/2002 | Zellweger | 707/100 |
| 6,356,961 | B1 | 3/2002 | Oprescu-Surcobe | |
| 6,360,252 | B1 | 3/2002 | Rudy et al. | 709/206 |
| 6,360,330 | B1 | 3/2002 | Mutalik et al. | 714/4 |
| 6,363,249 | B1 | 3/2002 | Nordeman et al. | 455/418 |
| 6,363,412 | B1 | 3/2002 | Niwa et al. | 709/203 |
| 6,374,250 | B2 | 4/2002 | Ajtai et al. | 707/101 |
| 6,381,700 | B1 | 4/2002 | Yoshida | 713/201 |
| 6,389,462 | B1 | 5/2002 | Cohen et al. | 709/218 |
| 6,396,482 | B1 | 5/2002 | Griffin et al. | 345/169 |
| 6,397,307 | B2 | 5/2002 | Ohran | 711/161 |
| 6,397,351 | B1 | 5/2002 | Miller et al. | |
| 6,401,104 | B1 | 6/2002 | LaRue et al. | 707/203 |
| 6,405,218 | B1 | 6/2002 | Boothby | 707/201 |
| 6,418,309 | B1 | 7/2002 | Moon et al. | 455/418 |
| 6,434,627 | B1 | 8/2002 | Millet et al. | 709/245 |
| 6,437,818 | B1 | 8/2002 | Ludwig et al. | 348/14.09 |
| 6,449,622 | B1 | 9/2002 | LaRue et al. | |
| 6,453,392 | B1 | 9/2002 | Flynn, Jr. | 711/151 |
| 6,457,062 | B1 | 9/2002 | Pivowar et al. | |
| 6,460,036 | B1 | 10/2002 | Herz | 707/10 |
| 6,462,644 | B1 | 10/2002 | Howell et al. | |
| 6,463,464 | B1 | 10/2002 | Lazaridis et al. | 709/207 |
| 6,466,967 | B2 | 10/2002 | Landsman et al. | 709/203 |
| 6,473,621 | B1 | 10/2002 | Heie | 455/466 |
| 6,480,896 | B1 | 11/2002 | Brown et al. | 709/231 |
| 6,484,143 | B1 | 11/2002 | Swildens et al. | 705/1 |
| 6,487,560 | B1 * | 11/2002 | LaRue et al. | 707/203 |
| 6,490,655 | B1 | 12/2002 | Kershaw | 711/151 |
| 6,496,944 | B1 | 12/2002 | Hsiao et al. | 714/15 |
| 6,499,108 | B1 | 12/2002 | Johnson | 713/201 |
| 6,505,216 | B1 | 1/2003 | Schutzman et al. | |
| 6,507,891 | B1 | 1/2003 | Challenger et al. | 711/122 |
| 6,516,314 | B1 | 2/2003 | Birkler et al. | |
| 6,516,327 | B1 | 2/2003 | Zondervan et al. | 707/200 |
| 6,519,452 | B1 | 2/2003 | Agostino et al. | |
| 6,523,063 | B1 | 2/2003 | Hanson | 709/206 |
| 6,523,079 | B2 | 2/2003 | Kikinis et al. | 710/303 |
| 6,532,588 | B1 | 3/2003 | Porter | |
| 6,535,743 | B1 | 3/2003 | Kennedy et al. | 455/456.1 |
| 6,539,494 | B1 | 3/2003 | Abramson et al. | 714/4 |
| 6,542,933 | B1 | 4/2003 | Durst, Jr. et al. | 709/229 |
| 6,546,425 | B1 | 4/2003 | Hanson et al. | 709/227 |
| 6,549,933 | B1 | 4/2003 | Barrett et al. | 709/203 |
| 6,553,375 | B1 | 4/2003 | Huang et al. | 707/10 |
| 6,553,410 | B2 | 4/2003 | Kikinis | 709/218 |
| 6,553,413 | B1 | 4/2003 | Leighton et al. | 709/219 |
| 6,567,850 | B1 | 5/2003 | Freishtat et al. | 709/224 |
| 6,567,857 | B1 | 5/2003 | Gupta et al. | |
| 6,581,065 | B1 | 6/2003 | Rodkin et al. | 707/102 |
| 6,584,454 | B1 | 6/2003 | Hummel et al. | 705/59 |
| 6,589,290 | B1 | 7/2003 | Maxwell et al. | 707/507 |
| 6,591,266 | B1 | 7/2003 | Li et al. | 707/10 |
| 6,591,306 | B1 | 7/2003 | Redlich | 709/245 |
| 6,591,362 | B1 | 7/2003 | Li | 713/1 |
| 6,597,700 | B2 | 7/2003 | Golikeri et al. | 370/401 |
| 6,601,143 | B1 | 7/2003 | Lamparter | |
| 6,609,005 | B1 | 8/2003 | Chern | 455/457 |
| 6,628,194 | B1 | 9/2003 | Hellebust et al. | |
| 6,636,894 | B1 | 10/2003 | Short et al. | 709/225 |
| 6,640,302 | B1 | 10/2003 | Subramaniam et al. | 713/169 |
| 6,643,707 | B1 | 11/2003 | Booth | 709/245 |
| 6,647,399 | B2 | 11/2003 | Zaremba | |
| 6,654,746 | B1 | 11/2003 | Wong et al. | 707/10 |
| 6,662,212 | B1 | 12/2003 | Chandhok et al. | |
| 6,665,721 | B1 | 12/2003 | Hind et al. | |
| 6,671,724 | B1 | 12/2003 | Pandya et al. | 709/226 |
| 6,671,757 | B1 | 12/2003 | Multer et al. | 710/100 |
| 6,684,206 | B2 | 1/2004 | Chen et al. | |
| 6,684,302 | B2 | 1/2004 | Kershaw | 711/151 |
| 6,694,335 | B1 | 2/2004 | Hopmann et al. | 707/200 |
| 6,694,336 | B1 | 2/2004 | Multer et al. | 707/100 |
| 6,701,316 | B1 | 3/2004 | Li et al. | 707/10 |
| 6,704,849 | B2 | 3/2004 | Steegmans | 711/162 |
| 6,714,987 | B1 | 3/2004 | Amin et al. | 709/249 |
| 6,718,348 | B1 | 4/2004 | Novak et al. | |
| 6,718,390 | B1 | 4/2004 | Still et al. | 709/229 |
| 6,725,239 | B2 | 4/2004 | Sherman et al. | 707/201 |
| 6,728,530 | B1 | 4/2004 | Heinonen et al. | 455/414.1 |
| 6,732,101 | B1 | 5/2004 | Cook | 707/10 |
| 6,732,264 | B1 | 5/2004 | Sun et al. | 713/2 |
| 6,738,789 | B2 | 5/2004 | Multer et al. | 707/201 |
| 6,741,851 | B1 | 5/2004 | Lee et al. | |
| 6,745,040 | B2 | 6/2004 | Zimmerman | 455/458 |
| 6,757,696 | B2 | 6/2004 | Multer et al. | 707/201 |
| 6,757,698 | B2 | 6/2004 | McBride et al. | 707/204 |
| 6,757,712 | B1 | 6/2004 | Bastian et al. | 709/206 |
| 6,781,575 | B1 | 8/2004 | Hawkins et al. | 345/173 |
| 6,795,848 | B1 | 9/2004 | Border et al. | 709/213 |
| 6,799,214 | B1 | 9/2004 | Li | 709/226 |
| 6,804,690 | B1 | 10/2004 | Dysert et al. | 707/204 |
| 6,804,783 | B1 | 10/2004 | Wesinger, Jr. et al. | 713/200 |
| 6,810,411 | B1 | 10/2004 | Coughlin et al. | |
| 6,812,961 | B1 | 11/2004 | Parulski et al. | 348/231.2 |
| 6,813,487 | B1 | 11/2004 | Trommelen | |
| 6,816,481 | B1 | 11/2004 | Adams et al. | 370/352 |
| 6,829,654 | B1 | 12/2004 | Jungck | |
| 6,836,657 | B2 | 12/2004 | Ji et al. | |
| 6,836,765 | B1 | 12/2004 | Sussman | 705/41 |
| 6,839,022 | B1 | 1/2005 | Benco et al. | |
| 6,839,568 | B2 | 1/2005 | Suzuki | |
| 6,842,695 | B1 | 1/2005 | Tu et al. | 701/213 |
| 6,850,944 | B1 | 2/2005 | MacCall et al. | 707/100 |
| 6,868,451 | B1 | 3/2005 | Peacock | 709/231 |
| 6,870,921 | B1 | 3/2005 | Elsey et al. | 379/218.01 |
| 6,886,013 | B1 | 4/2005 | Beranek | 707/10 |
| 6,892,225 | B1 | 5/2005 | Tu et al. | 709/217 |
| 6,892,245 | B1 | 5/2005 | Crump et al. | 709/245 |
| 6,904,449 | B1 | 6/2005 | Quinones | |
| 6,904,460 | B1 | 6/2005 | Raciborski et al. | 709/224 |
| 6,920,488 | B1 | 7/2005 | Le Pennec et al. | 709/219 |
| 6,925,476 | B1 | 8/2005 | Multer | 707/200 |
| 6,925,477 | B1 | 8/2005 | Champagne et al. | |
| 6,934,767 | B1 | 8/2005 | Jellinek | 709/247 |
| 6,944,651 | B2 | 9/2005 | Onyon et al. | 709/217 |
| 6,944,676 | B1 | 9/2005 | Armbruster et al. | 709/243 |
| 6,954,660 | B2 | 10/2005 | Aoyama | |

| Patent No. | Date | Inventor | Class |
|---|---|---|---|
| 6,954,783 B1 | 10/2005 | Bodwell et al. | 709/218 |
| 6,959,331 B1 | 10/2005 | Traversat et al. | |
| 6,963,914 B1 | 11/2005 | Breitbart et al. | 709/226 |
| 6,973,299 B2 | 12/2005 | Apfel | |
| 6,996,617 B1 | 2/2006 | Aiken, Jr. et al. | |
| 6,996,631 B1 | 2/2006 | Aiken, Jr. et al. | 709/242 |
| 7,003,555 B1 | 2/2006 | Jungck | 709/219 |
| 7,003,668 B2 | 2/2006 | Berson et al. | 713/182 |
| 7,007,041 B2 | 2/2006 | Multer et al. | 707/201 |
| 7,010,578 B1 | 3/2006 | Lewin et al. | |
| 7,016,964 B1 | 3/2006 | Still et al. | |
| 7,023,868 B2 | 4/2006 | Rabenko et al. | 370/419 |
| 7,030,730 B1 | 4/2006 | Zondervan | |
| 7,035,878 B1 | 4/2006 | Multer et al. | 707/201 |
| 7,039,656 B1 | 5/2006 | Tsai et al. | 707/201 |
| 7,051,275 B2 | 5/2006 | Gupta et al. | 715/512 |
| 7,054,594 B2 | 5/2006 | Bloch et al. | 455/41.2 |
| 7,054,952 B1 | 5/2006 | Schwerdtfeger et al. | |
| 7,082,476 B1 | 7/2006 | Cohen et al. | |
| 7,085,817 B1 | 8/2006 | Tock et al. | |
| 7,096,418 B1 | 8/2006 | Singhal et al. | |
| 7,099,915 B1 | 8/2006 | Tenereillo et al. | |
| 7,103,794 B2 | 9/2006 | Malcolm et al. | |
| 7,107,043 B2 | 9/2006 | Aoyama | |
| 7,110,954 B2 | 9/2006 | Yung et al. | |
| 7,116,681 B1 | 10/2006 | Hovell et al. | 370/466 |
| 7,146,161 B2 | 12/2006 | Chou | |
| 7,158,805 B1 | 1/2007 | Park et al. | |
| 7,162,494 B2 | 1/2007 | Arellano | 707/104.1 |
| 7,167,728 B1 | 1/2007 | Wagner et al. | 455/566 |
| 7,181,628 B2 | 2/2007 | Sato et al. | |
| 7,197,574 B1 | 3/2007 | Ishiyama | 709/245 |
| 7,233,791 B2 | 6/2007 | Gilbert et al. | 455/419 |
| 7,237,027 B1 | 6/2007 | Raccah et al. | |
| 7,249,175 B1 | 7/2007 | Donaldson | 709/225 |
| 7,269,433 B2 | 9/2007 | Vargas et al. | 455/502 |
| 7,284,051 B1 | 10/2007 | Okano et al. | 709/226 |
| 7,289,964 B1 | 10/2007 | Bowman-Amuah | 705/1 |
| 7,293,074 B1 | 11/2007 | Jellinek et al. | 709/205 |
| 7,315,826 B1 | 1/2008 | Guheen et al. | 705/7 |
| 7,317,907 B2 | 1/2008 | Linkert et al. | |
| 7,328,341 B1 | 2/2008 | Eun et al. | |
| 7,343,568 B2 | 3/2008 | Jiang et al. | |
| 7,349,719 B2 | 3/2008 | Buniatyan | |
| 7,356,559 B1 | 4/2008 | Jacobs et al. | 709/203 |
| 7,363,233 B1 | 4/2008 | Levine | 705/1 |
| 7,383,061 B1 | 6/2008 | Hawkins | |
| 7,392,034 B2 | 6/2008 | Westman et al. | 455/402 |
| 7,415,486 B2 | 8/2008 | Multer et al. | 709/201 |
| 7,440,746 B1 | 10/2008 | Swan | |
| 7,447,743 B1 | 11/2008 | Jordan, Jr. | 709/206 |
| 7,454,500 B1 | 11/2008 | Hsu et al. | 709/226 |
| 7,499,888 B1 | 3/2009 | Tu et al. | 705/44 |
| 7,505,762 B2 | 3/2009 | Onyon et al. | 455/419 |
| 7,519,702 B1 | 4/2009 | Allan | |
| 7,539,697 B1 | 5/2009 | Akella et al. | |
| 7,587,398 B1 | 9/2009 | Fredricksen et al. | |
| 7,596,609 B1 | 9/2009 | Refuah et al. | |
| 7,663,652 B1 | 2/2010 | Reese | |
| 7,707,150 B2 | 4/2010 | Sundararajan et al. | |
| 7,853,664 B1 | 12/2010 | Wang et al. | |
| 2001/0014893 A1 | 8/2001 | Boothby | 707/201 |
| 2001/0028363 A1 | 10/2001 | Nomoto et al. | |
| 2001/0034737 A1 | 10/2001 | Cane et al. | |
| 2001/0044805 A1 | 11/2001 | Multer et al. | |
| 2001/0047471 A1 | 11/2001 | Johnson | 713/1 |
| 2001/0051920 A1 | 12/2001 | Joao et al. | 705/41 |
| 2001/0056473 A1 | 12/2001 | Arneson et al. | |
| 2002/0007303 A1 | 1/2002 | Brokler et al. | 705/10 |
| 2002/0010868 A1 | 1/2002 | Nakashima et al. | 713/201 |
| 2002/0016818 A1 | 2/2002 | Kirani et al. | 709/206 |
| 2002/0016912 A1 | 2/2002 | Johnson | 713/165 |
| 2002/0032751 A1 | 3/2002 | Bharadwaj | 709/218 |
| 2002/0040369 A1 | 4/2002 | Multer et al. | 707/200 |
| 2002/0049852 A1 | 4/2002 | Lee et al. | 709/231 |
| 2002/0055909 A1 | 5/2002 | Fung et al. | 705/42 |
| 2002/0056011 A1 | 5/2002 | Nardone et al. | 709/248 |
| 2002/0059116 A1 | 5/2002 | Bulatovic et al. | 705/27 |
| 2002/0062365 A1 | 5/2002 | Nishikawa et al. | 709/223 |
| 2002/0067816 A1 | 6/2002 | Bushnell | |
| 2002/0069178 A1 | 6/2002 | Hoffman | |
| 2002/0073212 A1 | 6/2002 | Sokol et al. | 709/229 |
| 2002/0078075 A1 | 6/2002 | Colson et al. | 707/204 |
| 2002/0082995 A1 | 6/2002 | Christie | 705/44 |
| 2002/0083325 A1 | 6/2002 | Mediratta et al. | 713/191 |
| 2002/0091785 A1 | 7/2002 | Ohlenbusch et al. | 709/208 |
| 2002/0116444 A1 | 8/2002 | Chaudhri et al. | 709/201 |
| 2002/0120600 A1 | 8/2002 | Schiavone et al. | 707/1 |
| 2002/0128908 A1 | 9/2002 | Levin et al. | 705/14 |
| 2002/0138582 A1 | 9/2002 | Chandra et al. | 709/206 |
| 2002/0138765 A1 | 9/2002 | Fishman et al. | |
| 2002/0152278 A1 | 10/2002 | Pontenzone et al. | |
| 2002/0162011 A1 | 10/2002 | Tanaka et al. | 713/200 |
| 2002/0168964 A1 | 11/2002 | Kraft | |
| 2003/0021274 A1 | 1/2003 | Siikaniemi et al. | |
| 2003/0028451 A1 | 2/2003 | Ananian | 705/27 |
| 2003/0028554 A1 | 2/2003 | Koskimies et al. | 707/201 |
| 2003/0037020 A1 | 2/2003 | Novak et al. | |
| 2003/0061163 A1 | 3/2003 | Durfield | 705/44 |
| 2003/0065934 A1 | 4/2003 | Angelo et al. | 713/200 |
| 2003/0069874 A1 | 4/2003 | Hertzog et al. | |
| 2003/0084121 A1 | 5/2003 | De Boor et al. | 709/218 |
| 2003/0134625 A1 | 7/2003 | Choi | 455/418 |
| 2003/0135463 A1 | 7/2003 | Brown et al. | 705/44 |
| 2003/0139172 A1 | 7/2003 | Lampela et al. | 455/415 |
| 2003/0204568 A1 | 10/2003 | Bhargava et al. | 709/206 |
| 2003/0208546 A1 | 11/2003 | Desalvo et al. | 709/206 |
| 2003/0224760 A1 | 12/2003 | Day | 455/412.1 |
| 2003/0229898 A1 | 12/2003 | Babu et al. | 725/87 |
| 2003/0233383 A1 | 12/2003 | Koskimies | 707/204 |
| 2004/0054746 A1 | 3/2004 | Shibata | 709/207 |
| 2004/0093317 A1 | 5/2004 | Swan | 707/10 |
| 2004/0093342 A1 | 5/2004 | Arbo et al. | 707/102 |
| 2004/0093385 A1 | 5/2004 | Yamagata | 709/206 |
| 2004/0111465 A1 | 6/2004 | Chuang et al. | 709/203 |
| 2004/0120477 A1 | 6/2004 | Nguyen et al. | |
| 2004/0132428 A1 | 7/2004 | Mulligan | 455/411 |
| 2004/0142711 A1 | 7/2004 | Mahonen et al. | 455/502 |
| 2004/0148408 A1 | 7/2004 | Nadarajah | |
| 2004/0162830 A1 | 8/2004 | Shirwadkar et al. | 707/10 |
| 2004/0192260 A1 | 9/2004 | Sugimoto et al. | 455/412.1 |
| 2004/0192282 A1 | 9/2004 | Vasudevan | 455/419 |
| 2004/0193953 A1 | 9/2004 | Callahan et al. | 714/15 |
| 2004/0204120 A1 | 10/2004 | Jiles | |
| 2004/0224665 A1 | 11/2004 | Kokubo | 455/411 |
| 2004/0235523 A1 | 11/2004 | Schrire et al. | 455/558 |
| 2004/0267390 A1 | 12/2004 | Ben-Yaacov et al. | |
| 2004/0267944 A1 | 12/2004 | Britt | 709/229 |
| 2005/0021571 A1 | 1/2005 | East | 707/101 |
| 2005/0032527 A1 | 2/2005 | Sheha et al. | 455/456.1 |
| 2005/0038863 A1 | 2/2005 | Onyon et al. | 709/206 |
| 2005/0044404 A1 | 2/2005 | Bhansali et al. | |
| 2005/0060392 A1 | 3/2005 | Goring et al. | 709/220 |
| 2005/0064859 A1 | 3/2005 | Kotzin et al. | 455/419 |
| 2005/0086296 A1 | 4/2005 | Chi et al. | 709/203 |
| 2005/0086318 A1 | 4/2005 | Aubault | 709/213 |
| 2005/0090253 A1 | 4/2005 | Kim et al. | 455/435.1 |
| 2005/0096975 A1 | 5/2005 | Moshe | |
| 2005/0100150 A1 | 5/2005 | Dhara et al. | 379/142.01 |
| 2005/0102257 A1 | 5/2005 | Onyon et al. | 709/206 |
| 2005/0102328 A1 | 5/2005 | Ring et al. | 707/204 |
| 2005/0131990 A1 | 6/2005 | Jewell | 709/201 |
| 2005/0144200 A1 | 6/2005 | Hesselink et al. | |
| 2005/0144251 A1 | 6/2005 | Slate | |
| 2005/0203971 A1 | 9/2005 | Koskimies et al. | 707/203 |
| 2005/0204001 A1 | 9/2005 | Stein et al. | 709/206 |
| 2005/0227674 A1 | 10/2005 | Kopra et al. | |
| 2005/0240494 A1 | 10/2005 | Cue et al. | |
| 2005/0273632 A1 | 12/2005 | Kawakami | |
| 2006/0095397 A1 | 5/2006 | Torres et al. | |
| 2006/0190626 A1 | 8/2006 | Bhogal et al. | 709/248 |
| 2006/0212482 A1 | 9/2006 | Celik | |
| 2006/0233335 A1 | 10/2006 | Pfleging et al. | |
| 2007/0047533 A1 | 3/2007 | Criddle et al. | |
| 2007/0050734 A1 | 3/2007 | Busey | 715/853 |
| 2007/0220419 A1 | 9/2007 | Stibel et al. | |
| 2008/0009268 A1 | 1/2008 | Ramer et al. | |
| 2008/0022220 A1 | 1/2008 | Cheah | 715/769 |

| | | | |
|---|---|---|---|
| 2008/0039020 | A1 | 2/2008 | Eskin .......................... 455/41.2 |
| 2008/0064378 | A1 | 3/2008 | Kahan et al. |
| 2009/0037828 | A1 | 2/2009 | Waite et al. |
| 2009/0138546 | A1 | 5/2009 | Cruzada |
| 2009/0327305 | A1 | 12/2009 | Roberts et al. |

FOREIGN PATENT DOCUMENTS

| | | | |
|---|---|---|---|
| CN | 1202662 | | 12/1998 |
| CN | 1455522 | | 11/2003 |
| CN | 1313697 | A | 2/2005 |
| CN | 2003-122958 | | 7/2006 |
| EP | 0801487 | A2 | 10/1997 |
| EP | 0836131 | A2 | 4/1998 |
| EP | 0836301 | A | 4/1998 |
| EP | 0924917 | A2 | 6/1999 |
| EP | 0930593 | A | 7/1999 |
| EP | 1024441 | A2 | 2/2000 |
| EP | 0 986 225 | A1 | 3/2000 |
| EP | 0986225 | A1 | 3/2000 |
| EP | 1139608 | A2 | 10/2001 |
| EP | 1180890 | A2 | 2/2002 |
| EP | 1263244 | A2 | 4/2002 |
| GB | 2366050 | A | 2/2002 |
| JP | 7303146 | A | 11/1995 |
| JP | 10191453 | | 7/1998 |
| JP | 11242620 | | 9/1999 |
| JP | 11242677 | | 9/1999 |
| JP | 2000232680 | A | 8/2000 |
| JP | 2000316053 | A | 11/2000 |
| JP | 2002142254 | A | 5/2002 |
| JP | 2002185575 | A | 6/2002 |
| JP | 2002247144 | A | 8/2002 |
| JP | 2002314689 | A | 10/2002 |
| JP | 2003259011 | A | 9/2003 |
| WO | WO 97 04391 | | 2/1997 |
| WO | WO 97/39564 | | 10/1997 |
| WO | WO 97 41520 | | 11/1997 |
| WO | WO 98/03005 | | 1/1998 |
| WO | WO 98 21648 | | 5/1998 |
| WO | WO 98/29994 | A | 7/1998 |
| WO | WO 98 54662 | | 12/1998 |
| WO | WO 98/56159 | A | 12/1998 |
| WO | WO 99/05813 | | 2/1999 |
| WO | WO 99/06900 | | 2/1999 |
| WO | WO 99/36870 | | 7/1999 |
| WO | WO 99/40514 | | 8/1999 |
| WO | WO 99/45451 | | 9/1999 |
| WO | WO 99/45484 | | 9/1999 |
| WO | WO 99/46701 | A | 9/1999 |
| WO | WO 99/50761 | | 10/1999 |
| WO | WO 99/65256 | | 12/1999 |
| WO | WO 00/11832 | | 3/2000 |
| WO | WO 00/16222 | | 3/2000 |
| WO | WO 00/29998 | | 5/2000 |
| WO | 0133874 | A1 | 5/2001 |
| WO | WO 01/71539 | | 9/2001 |
| WO | WO 01/80535 | A1 | 9/2001 |
| WO | 0217140 | A2 | 2/2002 |
| WO | 03-083716 | A1 | 10/2003 |
| WO | WO 2005/112586 | A2 | 12/2005 |

OTHER PUBLICATIONS

Response to Non-Final Office Action dated Jan. 28, 2008, U.S. Appl. No. 09/753,537, filed Jan. 2, 2001.

Final Office Action dated Feb. 7, 2008, U.S. Appl. No. 09/753,537, filed Jan. 2, 2001.

Notice of Allowance dated Apr. 8, 2008, U.S. Appl. No. 10/659,646, filed Sep. 10, 2003.

Internate Mail Consortium: "vCard Overview," Retrieved from the Internet: www.imc.org/pdi/vcardoverview.html, Oct. 13, 1998.

Internate Mail Consortium: "vCard The Electronic Business Card," Retrieved from the Internet: www.imc.org/pdi/vcardwhite.html, Jan. 1, 1997.

Batista et al., "Mining Web Access Logs of an On-line Newspaper," A survey, SIGKKD Explorations, Jul. 2000, 8 pages.

Lee et al., "Monitoring Data Archives for Grid Environments," 11th IEEE symposium on high performance distributed computing, Jul. 2002, pp. 1-10.

Intellisync email Accelerator, A detailed guide to functionality, Product functionality paper, Mar. 2004, pp. 1-18.

Finnigan, Anne, "The Safe Way to Shop Online," Sep. 1998, p. 162, Good Housekeeping, v. 227 No. 3.

Chase, Larry, "Taking Transactions Online," Oct. 1998, pp. 124-132, Target Marketing, v.21 No. 10.

Gong, Li, "Increasing Availability and Security of an Authentication Service," Jun. 1993, pp. 657-662, IEEE Journal on Selected Areas in Communications, v. 11 No. 5.

DeMaio, Harry B., "My MIPS are Sealed," Sep./Oct. 1993, pp. 46-51, Chief Information Officer Journal, v. 5 issue 7.

Final Office Action mailed Jul. 8, 2010, U.S. Appl. No. 12/228,978, pp. 1-10.

Non-final Office Action mailed Jan. 25, 2010 for U.S. Appl. No. 12/228,978, 10 pgs.

Rou et al., "Online File Storage System," 2002 Student Conference on Research and Development Proceedings, Shah Alam, Malaysia, Nov. 7, 2002, IEEE, pp. 83-86.

Agarwal et al., "On the Scalability of Data Synchronization Protocols for PDAs and Mobile Devices," Jul. 2002, IEEE Network, pp. 22-28.

United States Patent & Trademark Office, Office Action mailed Jul. 20, 2011, for U.S. Appl. No. 12/037,609, 24 pgs.

Reed, Benjamin C., et al.,"Authenticating Network-Attached Storage,"IEEE, Jan.-Feb.2000, pp. 49-57.

Gaskin, J.E.:Messaging-Instant Enterprise—Once a Novelty item, IM is Becoming a More Serious Tool for Business Users, InternetWeek, No. 810, Apr. 24, 2000, p. 55.

BusinessWire, "FusionOne Partners with WhitePages.com to Deliver Automatic Synchronization for Online Subscriber,"press release, Oct. 11, 2000.

Malone, et al., Semi-Structured Messages are Suprisingly Useful for Computer-Supported Coordination', Proceedings of the Conference on Computer-Supported Cooperative Work, Austin, Texas, Dec. 3-5, 1986, pp. 1-26.

Patel et al.,"The Multimedia Fax-MIME Gateway," 8440 IEEE MultiMedia No. 4, Jan. 1994, 7 pgs.

Lamb et al.,"LAN-Based Office for the Enterprise, A Case Study," Advantis Company, White Plains, NY 10605, Jan. 1994 IEEE, pp. 440-447.

Japanese Office Action, Sep. 2, 2010, Application No. 2001-057454, pp. 1-3.

Japanese Office Action, Sep. 2, 2010, Application No. 2001-059232, pp. 1-3.

Japanese Office Action, Sep. 2, 2010, Application No. 2001-059233, pp. 1-3.

United States Patent and Trademark Office, Office Action mailed Feb. 15, 2011, for U.S. Appl. No. 12/037,609, 26 pgs.

Non-final Office Action mailed Jun. 8, 2010, U.S. Appl. No. 12/037,609, 33 pgs.

United States Patent and Trademark Office, Office Action mailed Nov. 9, 2010, for U.S. Appl. No. 12/037,609, pp. 1-37.

Advisory Action dated Sep. 26, 2011, U.S. Appl. No. 12/037,609, Filed Feb. 26, 2008, David L. Multer.

* cited by examiner

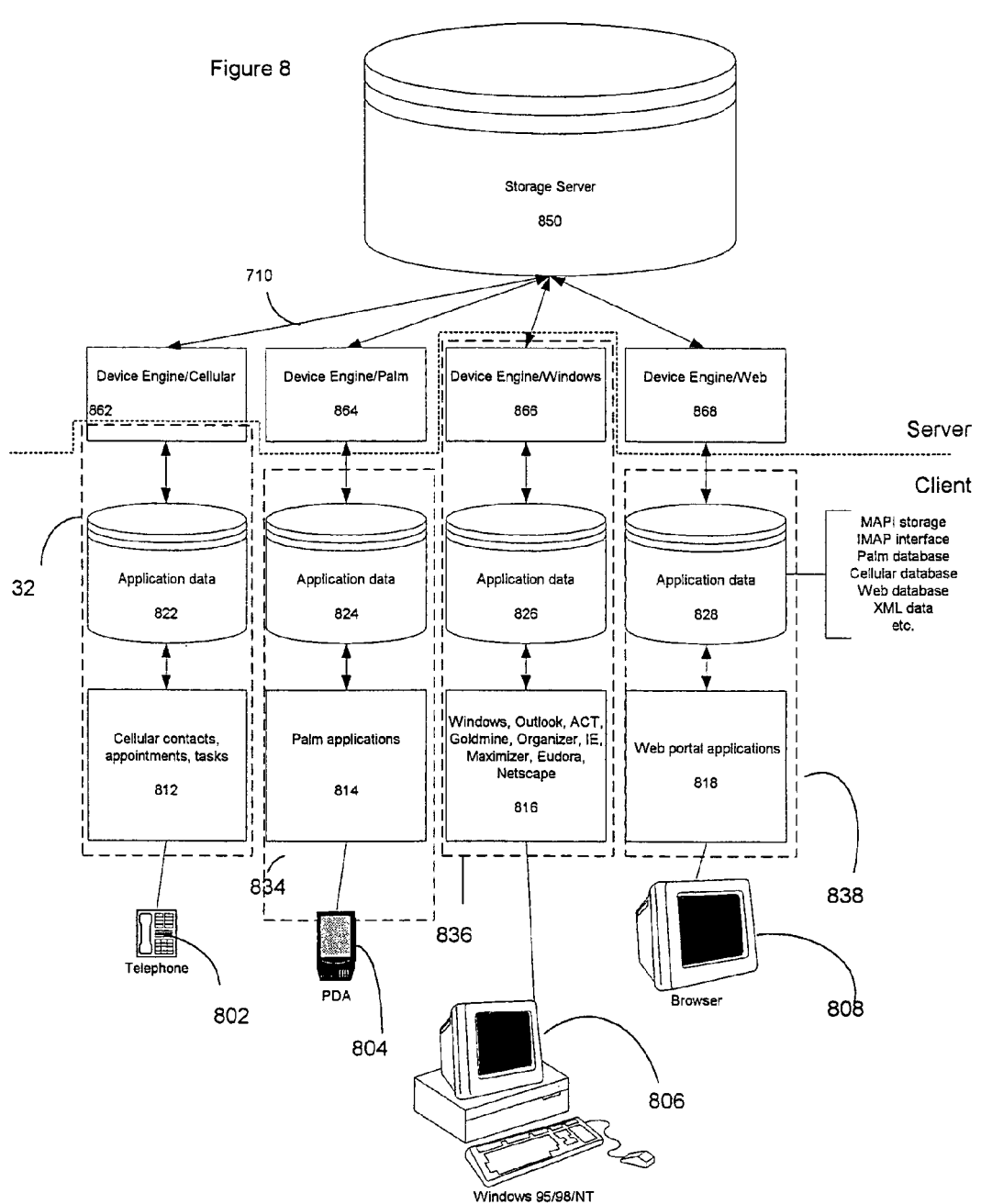

Desktop Device Engine

Object Hierarchy

Pull Synchronization

Push Synchronization

DATA TRANSFER AND SYNCHRONIZATION SYSTEM

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever

BACKGROUND OF THE INVENTION

1. Field of the Invention

The invention relates to the transference of data between two systems independent of the form in which the data is kept on the respective systems, and in particular to providing an efficient means of communicating data between systems and devices.

2. Description of the Related Art

The growth of computing-related devices has not been limited to personal computers or work stations. The number of personal computing devices has grown substantially in both type and format. Small, hand-held computers carry a multitude of contact, personal, document, and other information and are sophisticated enough to allow a user to fax, send e-mails, and communicate in other ways wirelessly. Even advanced cellular phones carry enough memory and processing power to store contact information, surf the web, and provide text messaging. Along with the growth in the sophistication of these devices, the need to transfer information between them has grown significantly as well.

With a multitude of different device types on the market, keeping information between the different devices synchronized has become increasingly problematic. For example, if an individual keeps a calendar of information on a personal computer in his or her office using a particular personal information manager application, the individual would generally like to have the same information available in a cellular phone, hand-held organizer, and perhaps a home personal computer. The individual may additionally have a notebook computer which requires synchronizing file data such as presentations or working documents between the notebook and the office computer.

Until now, synchronization between both documents and personal information managers has occurred through direct connection between the devices, and generally directly between applications such as a personal information manager in one device and a personal information manager in another device or using an intermediary sync-mapping program.

One example of this is the prevalent use of the 3Com Palm® OS-based organizer, such as the 3Com Palm® series of computing devices, which uses its own calendaring system, yet lets users synchronize the data therein with a variety of different personal information manager software packages, such as Symantec's ACT!™, Microsoft's Outlook®, and other systems. In this example, an intermediary synchronization program such as Puma Technology, Inc.'s Intellisync® is required. Intellisync® is an application program which runs on both the hand-held device and the computer which stores the information data and maps data systems between non-uniform data records. In other cases, direct transfer between applications such as transfer between Microsoft's Outlook® computer-based client and Microsoft's Windows CE "Pocket Outlook" application, is possible. Nevertheless, in both cases, synchronization occurs through direct connection between a personal computer and the personal computing device. While this connection is generally via a cable directly connecting, for example, Palm® device in a cradle to the personal computer, the connection may be wireless as well.

One component of these synchronization systems is that the synchronization process must be able to delineate between when changes are made to specific databases and must make a decision about whether to replace the changed field. Normally, this is measured by a change in one database, and no-change in a second database. In some cases, both databases will have changed between syncs. In this case, the sync operation must determine which of the two changes which has been made is to "win" and replace the other during the sync. Generally, this determinant of whether a conflict exists allows some means for letting the user resolve the conflict.

In a technical sense, synchronization in this manner is generally accomplished by the copying of full records between systems. At some level, a user is generally required to map data fields from one application to another and specify which data fields are assigned to which corresponding field in a different device. Less mapping is required where developers more robustly support various platforms of applications.

In many instances, the data to be synchronized is generally in the form of text data such as records of addresses, contact information, calendar information, notes and other types of contact information. In certain instances, data to be synchronized will be binary format of executable files or word processor-specific documents. In many cases where document synchronization is required, the synchronization routine simply determines whether or not the documents in question have changed, and uses a time-based representation to determine which of the two files is newer, and replaces the older file with the newer file to achieve synchronization, as long as the older of the two files was in fact not changed. This is the model used in the familiar "Briefcase" function in Microsoft Windows-based systems. If both files have changed, then the synchronization routine presents the option of conflict resolution to the user.

Such synchronization schemes are generally relatively inefficient since they require full band-width of the document or binary file to be transferred via the synchronization link. In addition, at some level the synchronization programs require interaction by the user to map certain fields between different programs.

One of the difficulties in providing synchronization between different computing devices is that the applications and platforms are somewhat diverse.

Nevertheless, all synchronization programs generally require certain functions in order to be viable for widespread usage. In particular, synchronization programs must work with popular applications on various platforms. Sync applications must allow for conflicts resolution when changes are made to the same information on different devices between syncing events. They must provide synchronization for all types of formats of data, whether it be text data in the form of contacts, e-mails, calendar information, memos or other documents, or binary data in the form of documents or programs in particular types of formats.

In a broader sense, applications which efficiently synchronize data between disparate types of devices can provide advantages in applications beyond synchronizing individual, personal information between, for example, a personal information manager hardware device such as a Palm® computing device, and a personal computer. The same objectives which are prevalent in developing data transfer between personal information management (PIM) devices and desktop systems lend themselves to furthering applications requiring data transfer between other types of devices, on differing platforms. These objectives include speed, low bandwidth, accuracy, and platform independence.

For example, current e-mail systems use a system which is somewhat akin to the synchronization methods used for disparate devices in that an entire message or file is transferred as a whole between different systems. When a user replies to an e-mail, generally the entire text of the original message is returned to the sender, who now has two copies of the e-mail text he/she originally sent out. The same is true if an e-mail attachment is modified and returned. All of the text which is the same between both systems is essentially duplicated on the originator's system.

SUMMARY OF THE INVENTION

The invention comprises a data transmission system which optimizes transfer and updates of information between systems by providing difference information between the systems. Information transfer can occur one way (broadcast) or two-way (sync).

The invention, roughly described, comprises a data transmission system. In a first aspect, the system includes a differencing transmitter transmitting at least one set of difference transactions and a differencing receiver receiving said at least one set of difference transactions. The differencing transmitter of the data transmission system may comprise a difference source interface, a copy of a previous state of said difference source, and a difference transaction generator. The differencing receiver of the data transmission system comprises a difference destination interface, a copy of a previous state of said difference destination, and a destination data constructor. The difference source interface converts difference source data to a universal format. The differencing transmitter and differencing receiver may be coupled to a storage server, and said difference information is transmitted to said storage server by said differencing transmitter and retrieved from said storage server by said differencing receiver. The data transmission system further includes a management server communicating with said differencing transmitter and said differencing receiver.

In a further embodiment, the data transmission system is coupled to a network. The system includes a differencing transmitter the transmitting at least one set of change transactions reflecting changes to a data source to the network, and a plurality of differencing receivers coupled to the network receiving said at least one set of change transactions from the network.

In another embodiment, the invention comprises a data synchronization system for a first system having a plurality of data sources each with a data source format, and a second system having a plurality of data sources each with a data source format. The data sync system comprises a first data synchronizer on the first system transmitting at least one set of difference information to an output, and a second data synchronizer on the second system coupled to the first system receiving said at least one set of difference information from the first system.

In yet another embodiment, the invention comprises a data synchronization system which includes a server. A first system having a plurality of data file types on the system is coupled to the server. The first system includes a differencing synchronizer on the first system extracting a first set of differencing data from the data files on the first system when the data files on the system are changed, outputting the differencing data to the server, and retrieving differencing data from the server and applying it to selected data files on the first system. The system includes at least one second system having a second plurality of data file types on the second system and a differencing synchronizer on the second system extracting the differencing data from the data files on the second system when the data files on the system are changed, outputting the differencing data to the server, and retrieving first set of differencing data from the server and applying it to selected data files on the second system.

In a still further aspect of the invention, a method for synchronizing at least a first file and a second file resident on a first and a second systems, respectively, is provided. The method comprises the steps of: determining difference data resulting from changes to a first file on the first system; transmitting the difference information to a second system; applying the difference information to generate change data for the second file; and updating the second file on the second system with the difference data.

BRIEF DESCRIPTION OF THE DRAWINGS

The invention will be described with respect to the particular embodiments thereof. Other objects, features, and advantages of the invention will become apparent with reference to the specification and drawings in which:

FIG. 8 is an overview of one embodiment of the system architecture in accordance with the present invention.

DETAILED DESCRIPTION

The present invention includes a system and a method for transferring data between two devices which require information to be shared between them. In accordance with the discussion herein, a "device" is defined as a collection of elements or components organized for a common purpose, and may include hardware components of a computer system, personal information devices, hand-held computers, notebooks, or any combination of hardware which may include a processor and memory which is adapted to receive or provide information to another device; or any software containing such information residing on a single collection of hardware or on different collections of hardware. Such software might include applications such as personal information managers, which include contact data and other such information, e-mail systems, and file systems, such as those utilized by Microsoft Windows NT operating systems, Unix operating systems, Linux operating systems, or other systems capable of storing file types having binary formats which translate to application formats of differing types.

In one embodiment, the invention comprises a set of programs specifically designed to transmit and/or receive differencing data from one device to another device, irrespective of the type of file system, data, content, or system hardware configuration.

In a further aspect, the system comprises store and forward technology which utilizes the differencing technology to implement services via a public or private network, such as the Internet.

The system of the present invention finds particular usages in synchronizing personal contact information between different systems, but it will be readily apparent to one of average skill in the art that the present invention provides advantages having broader applicability than merely synchronizing various types of systems. For example, replying and forwarding e-mail can be made more efficient by forwarding only the differences in e-mails between systems. As a further example, updates to systems software via a network can be made more efficient where, for example, instead of completely replacing different modules of an application, only the differences of the modules need be forwarded, resulting in more efficient use of existing bandwidth.

System Overview

FIGS. 1-7 show various configuration alternatives of the present invention.

Figure 1:
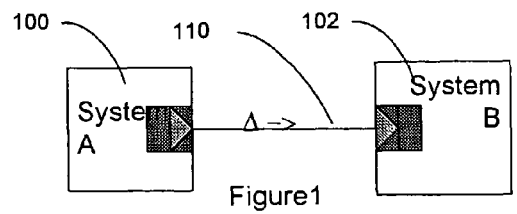
FIGS. 1-7 are block diagrams of various configurations of the system of the present invention utilizing the differencing routines of the present invention.

FIG. 1 shows an embodiment of the present invention in a basic configuration. In FIG. 1, a first system or device, system A, and a second system or device, system B, are coupled by a communication line 110. It should be readily understood that communication line may be any direct coupling of the two systems which allows data to pass between the systems such as, for example, by means of serial ports, parallel ports, an Ethernet connection or other type of network, or an infrared link, or the like. System A includes a functional block 100 representing a differencing transmitter in accordance with the present invention. System B includes a functional block 102 representing the differencing receiver in accordance with the present invention.

The differencing transmitter 100, upon receipt of a control signal enabling operation of the transmitter, examines a specified data structure of information which is to be transmitted to system B. Differencing transmitter 100 extracts such information from System A and converts the information extracted into difference information $\Delta$. Difference information $\Delta$ comprises only the changes to System B's data which have occurred on System B and instructions for implementing those changes. Hence, if the data to be transferred is a change to a file which exists on system B, difference information $\Delta$ comprises only the differences in such file and where such differences occur. If the data does not exist at all on System B, the difference information $\Delta$ will be the entire file. Difference information $\Delta$ received by differencing receiver 102 at System B is reconstructed at System B, and the changes reflected therein are updated on System B.

For example, if System A and System B are two computers and an update for certain binary files on System A is required, the differencing transmitter on System A will extract the differences in the file known to exist on System B and any new files, and transmit only those differences (an instructions for where to insert those differences) to the differencing receiver 102. Differencing receiver 102 will interpret the difference information ($\Delta$) and reconstruct the binary files on System B. In this manner, the information on System B is updated without the need to transfer the entire binary files between the Systems.

Figure 2:
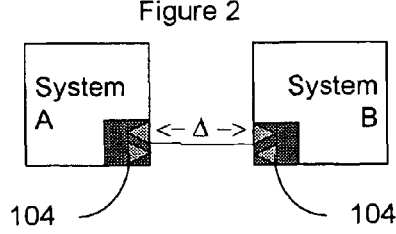

FIG. 2 shows a second example of the system of the present invention. In FIG. 2, both System A and System B include functional blocks 104, each representing a differencing synchronizer. The function of the synchronizer 104 is similar to that of the transmitter and receiver combined; the synchronizer will allow difference information $\Delta$ to be both transmitted and received. For example, System A and System B are a portable computer and a desktop computer, respectively, where information such as contact information needs to be synchronized between the two, the differencing synchronizer 104 will extract changes made to the contact information on either System A or System B and at predetermined times, transmit the information $\Delta$ between the systems, and reconstruct the data on the receiving system to update information from the sending system, in order to ensure that both systems contain the same data.

Figure 3:
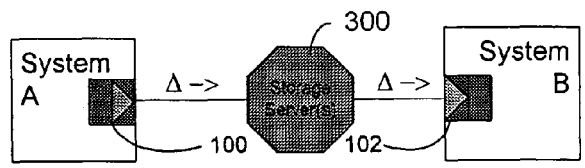

FIG. 3 shows yet another alternative embodiment of the system of the present invention. In FIG. 3, System A again includes a differencing transmitter and System B includes a differencing receiver 102. In this embodiment, a storage server 300 is coupled between System A and System B. Storage server 300 may store a separate database of the difference information $\Delta$ provided by System A, which allows System A to provide its difference information $\Delta$ to the storage server 300 at a first point in time, and storage server 300 to provide the same difference information $\Delta$ to System B at a second point in time, but not the same as the first point in time. In addition, multiple sets of difference information $\Delta$ may be provided at different points in time, and stored for later retrieval by System B. Still further, the difference information sets may be maintained on server 300 to allow data on either System A or System B to be returned to a previous state.

Once again, the storage server 300 is coupled by a direct connection 110 to both System A and System B. Storage server 300 may be a server specifically adapted to receive differencing information $\Delta$ from the receiver 100 and provide it to the transmitter 102. In one embodiment, server 300 includes specific functional routines for enabling this transfer. Alternatively, server 300 comprises standard information server types which respond to standard Internet communication protocols such as file transfer protocol (FTP), or hypertext transfer protocol (HTTP).

Figure 4:
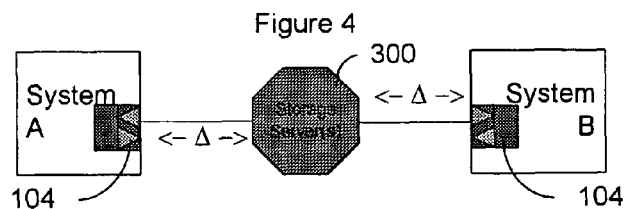

FIG. 4 shows yet another alternative embodiment of the system of the present invention wherein System A and System B, once again coupled directly to a storage server 300 by a direct connection line 110, each include a differencing synchronizer 104. Difference information $\Delta$ can be passed to and from System A through synchronizer 104 to and from the storage server 300 at a first point in time, and to and from System B at a second point in time. In this embodiment, storage server 300 may include routines, described below, for resolving conflicts between data which has changed on both System A and System B independently after the last point in times when the systems were synchronized.

Figure 5:
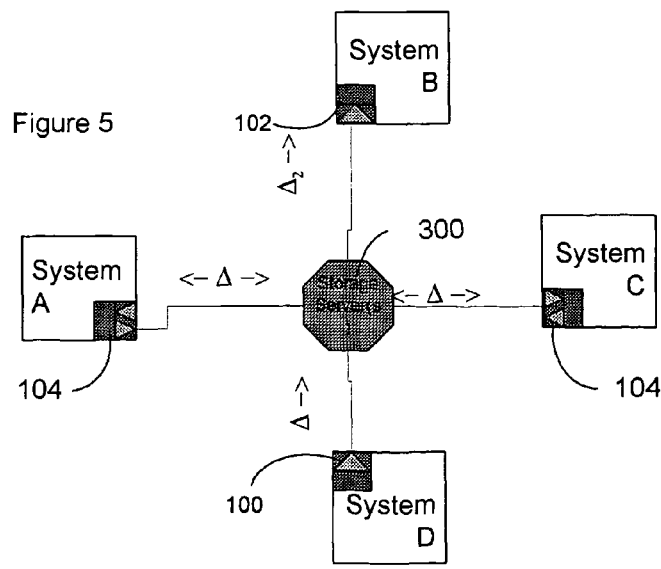

FIG. 5 shows yet another alternative embodiment of the present invention including four systems: System A which includes a differencing synchronizer 104; System B which includes a differencing receiver 102; System C which also includes a differencing synchronizer 104; and System D which includes a differencing transmitter 100. Each is directly coupled to a storage server 300, allowing control of transmission of differencing data Δ between the various systems. Server 300 may include routines, described in further detail below, to track the various types of systems which comprise System A through System D, and which control the transmission of various components of the difference information Δ to each of the various systems. For example, since System B includes only differencing receiver 102, the difference information $\Delta_2$ which is provided to it may be a sub-component of that which is transferred between System A in the storage server 300, or may be simply receiving broadcast information $\Delta_4$ from System D. In one embodiment of the system of the present invention, server 300 does not itself route the difference information derived from each receiver/transmitter/synchronizer. Server 300 acts as a repository for the information, and the determination of which difference information Δ is attributed to which receiver/transmitter/synchronizer is made by each receiver/transmitter/synchronizer.

Figure 6:
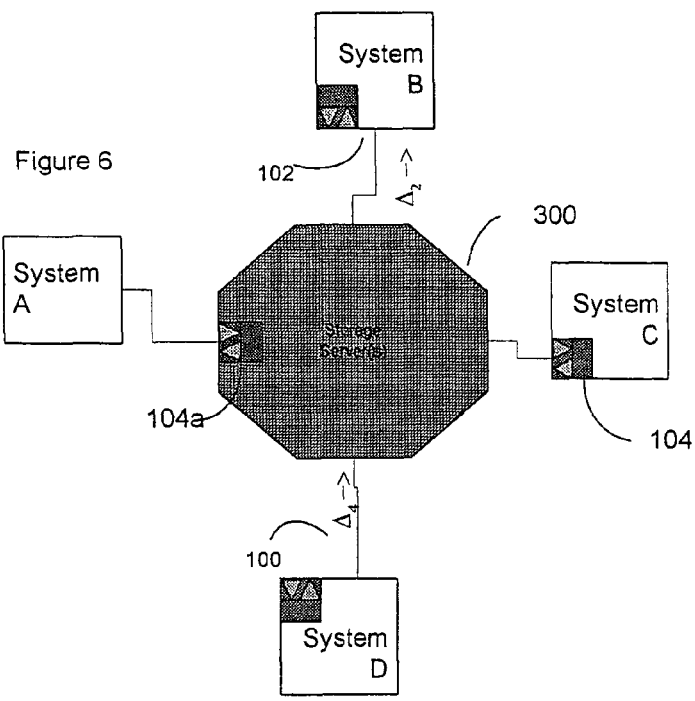

FIG. 6 shows yet another alternative embodiment of the present invention. In FIG. 6, a synchronizer is provided in storage server 300. It should be recognized that a forwarder and/or receiver may be provided in server 300 as well. The particular embodiment shown herein may be advantageous where device processing power and memory are limited, such as cases where the device is a cell phone. It should be noted that the data transferred between system A and the device engine 104a in such an embodiment may or may not be difference information, depending on whether System A has the capacity to detect and output difference information. Each of the devices may include a differencing receiver, a differencing transmitter, or a differencing synchronizer. It should be understood that a portion of the differencing synchronizer 104a may reside on System A and another portion may reside on server 300.

Figure 7:
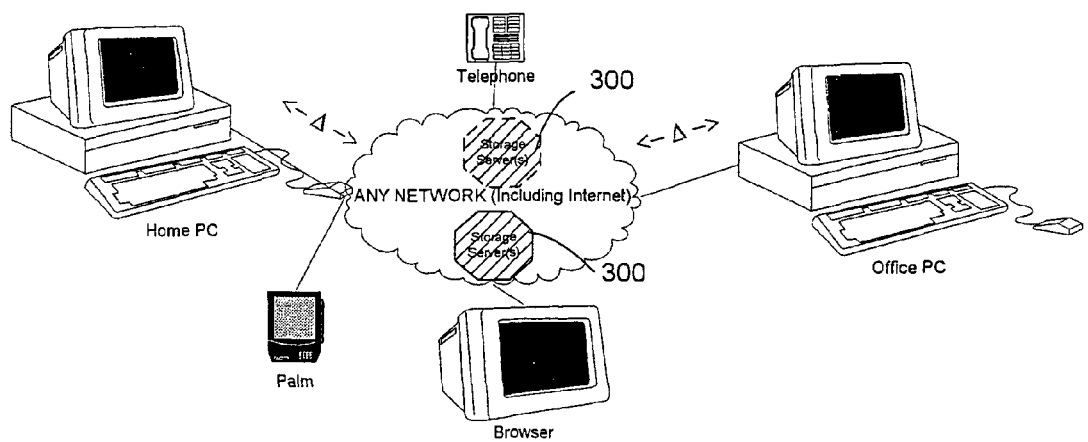

FIG. 7 shows yet another alternative embodiment of the present invention wherein the devices shown in FIG. 6 may be coupled to a combination of public or private networks 700 such as, for example, the Internet. The network 700 may include one or more storage servers $300_1, 300_2$, and in such cases the difference information Δ transmitted between each such device 602-610 via intermediate storage on one of such servers. Network 700 may couple the devices to one or more specialized function servers, such as servers specifically designed to include a differencing forwarder, receiver or synchronizer. Such devices may comprise, by way of example and without limitation, a personal office PC 602, a smart telephone 604, a user's office PC 606, a personal information Palm® computing device 608, a telephone or cellular phone 604, a home personal computer 606, or a web browser 610. Each differencing receiver, differencing transmitter, or differencing synchronizer present in devices 602-610 includes means to poll the data stored on storage servers $300_1, 300_2$ to determine whether the data present at storage server $300_1$, $300_2$ includes difference information which the particular receiver or synchronizer is required to have to synchronize the data on the device on which it resides.

In the following description, an embodiment wherein the differencing receiver, transmitter, and synchronizer are described will be discussed with respect to its use in synchronizing contact information, calendar information, and binary file information between a plurality of different devices in the context of data synchronization. It will be readily understood that the system of the present invention is not limited to synchronization applications, or applications dependent upon specific types of data, such as contact information or scheduling information. In particular, it will be readily understood that the transmission of data comprising only the differences in data between two systems via routines which extract the data and reassemble data on the various systems, represents a significant advancement in the efficient transmission of data. The present invention allows for optimization in terms of a reduction in the bandwidth utilized to transmit data between two systems, since only changes to data are transferred. This consequently increases the speed at which such transactions can take place since the data which needs to be transmitted is substantially smaller than it would be were entire files transferred between the systems.

In a particular embodiment of the present invention, the ability of devices to connect to the Internet is leveraged to manage data transfer between the systems. In essence, each particular device which requires information access which can connect to the Internet may become part of the system of the present invention, and synchronize its data with other devices defined by a user as being part of the system.

Generally, the system comprises client software which provides the functions of the differencing transmitter 100, differencing receiver 102, and differencing synchronizer 104 in the form of a device engine. The device engine includes at least one component particular to the type of device on which the device engine runs, which enables extraction of information from the device and conversion of the information to difference information, and transmission of the difference information to the storage server. This allows the replication of information across all systems coupled to the system of the present invention. Although the storage servers 300 utilized in the system of the present invention may be any type of storage server, such as an Internet server or an FTP server, and may be provided from any source, such as any Internet service provider (ISP), particular aspects of a storage server which may be useful and which may be customized to optimize transfer of information between systems coupled as part of the present invention will be described below. Synchronization of devices utilizing the synchronization system of the present invention is possible as long as an Internet connection between the devices is available.

In a key aspect of the invention, the Internet connection between the devices or between the devices and a server, need not exist at the same point in time, and new devices may be added to the system of the present invention at any point in time without the loss of information. The system provides totally transparent access to information and the device engine on each device provides an operating system independent extension which allows seamless integration of the personal information services in accordance with the present invention.

In a particular unique aspect of the present invention, only those changes to the information which are required to be forwarded to other systems on the system of the present invention are transmitted to enable exceptionally fast response times. In a still further aspect of the invention, information which is transferred in this manner is encrypted to ensure security over the public portions of the Internet.

Architecture Overview

FIG. 8 shows an overview of the architecture of the system of the present invention utilized for synchronizing or "syncing" information on different types of devices. In the embodiment hereinafter described, the system of the present invention allows the coupling of a collection of personal devices and applications one uses when working with personal information. Nevertheless, the system may be used to broadcast public or private information to various device types. System software in the form of a device engine for each device which is declared a part of the system of the invention is distributed across the collection of devices to enable synchronization.

Distribution of the device engines may occur via, for example, an installation package forwarded over an Internet connection. In essence, the device engine software of the present invention forms a distributed processing network which maintains consummate synchronization of all information in the system. The processing load associated with delivering this service is pushed to the end-point devices which provides for easy scaling of the system to ever-larger applications.

The present invention contemplates the use of two types of device engine: one totally embodied on the server which outputs change data to the server; and a second totally embodied on the server receiving device generated change information from the device. In addition, a hybrid of the two, having a portion of the device engine on the device and a portion on the server, is disclosed.

As shown in FIG. 8, any number and type of devices 802-808 may be utilized in accordance with the system of the present invention. A telephone 802 may comprise a cellular phone or a standard POTS-connected telephone. Telephone 802 may include contact information and, as is supported with a newer generation of cellular telephones, appointments and task data stored in a data structure 812. The application 812 which utilizes the application data 822 comprising such information is all stored in the telephone unit 802. Likewise, a personal digital assistant such as a Palm® computing device 804 includes application 814 and application data 824 which may include information such as contacts, appointments and tasks, and may also include file information such as documents which are created and stored on the PDA 804. Device 806 is represented as a Windows personal computer running an operating system such as Microsoft Windows 95, 98, NT or 2000. Applications 816 which may be running on device 806 include the Windows operating system itself, Microsoft Outlook, Symantec's ACT Personal Information Manager, Goldmine Software's Goldmine, Lotus Organizer, Microsoft's Internet Explorer web browser, Netscape's Communicator Suite, Qualcomm's Eudora e-mail, and various other programs, each of which has its own set of application data 826 which is required to be synchronized not only with devices outside the system 806, but also between devices and applications within the system itself. Finally, a dedicated web browser client 808 is shown which couples via the Internet to web portal applications 816 which have their own set of application data 828. Unlike devices 806 which store the application and application data substantially in their own hardware, web portal applications are provided on a separate server and provided to browser 808 via an Internet connection. Nevertheless, the web portal application stored on the portal application provider includes a set of application data 828 which a user may wish to synchronize. For example, a large web portal such as Yahoo! and Snap.com provide services such as free e-mail and contact storage to their users. A user may wish to synchronize this with applications running on their cellular phone, PDA, or Windows devices.

In order to access the specific application data of each of the systems shown in FIG. 8, a device engine is associated with each type of device. A cellular device engine 862 communicates and incorporates itself with the application data 822 of the cellular phone. Likewise, a PDA device engine 864 is provided, which may be based on either the Palm® operating system, Windows CE operating system, or other PDA-type operating systems as necessary. A Windows-based device engine 866 includes a mechanism, discussed below, for extracting application data 826 from supported Windows applications 816, and a web services device engine 868 incorporates to extract application data 828 from web portal applications 818.

Figure 9A:
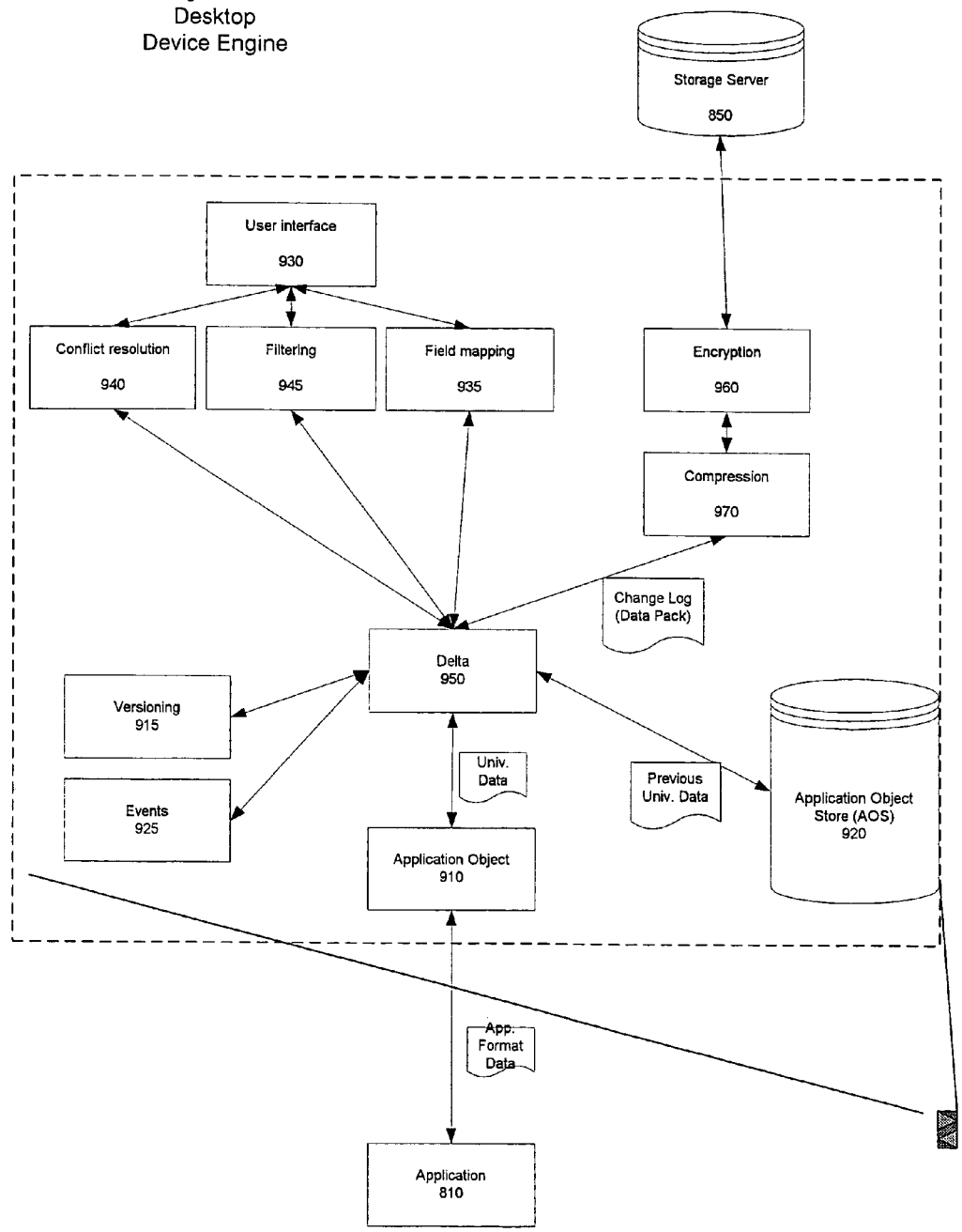
FIG. 9A is a block diagram of the desktop device engine of the present invention.
Figure 9B:
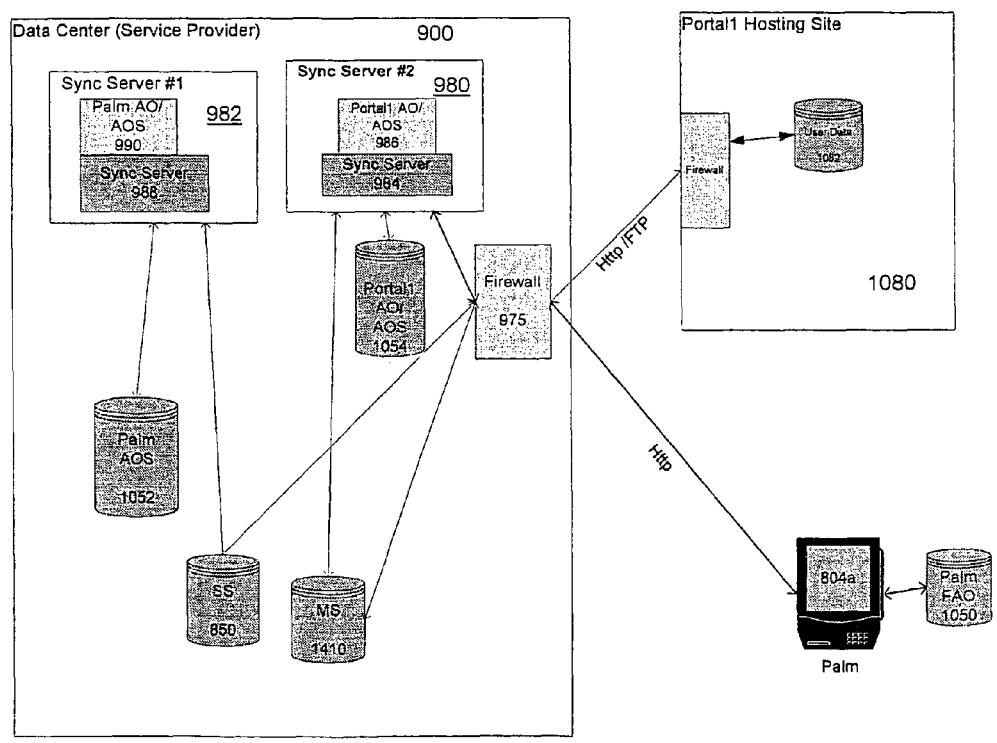
FIG. 9B is a block diagram of the configuration of server side device engines utilized in accordance with the present invention.

As shown in FIG. 8, some device engines are provided entirely on the device (and are referred to herein as desktop device engines), while others include components a the back end server (which may comprise storage server 850 or a specialized server, as shown in FIG. 9B.) This is illustrated generally by lines 832, 834, 836, and 838 in FIG. 8. Also, in FIG. 8, elements above dashed line 855 are provided by an administrator or service provider of the system of the present invention. Each of the device engines 862, 864, 866 and 868 is configured relative to the type of device on which it resides. For example, the Cell phone device engine 862 includes one or more components arranged on the phone while others are on server 850. Conversely, device engine 866 resides entirely on the windows device 806.

Data from each of the devices is coupled via an Internet connection 710 with a storage server 850. As noted above, storage server 850 may be a generic storage server or it may be a storage server specifically adapted for use with the system of the present invention as discussed below. One or more of the storage servers 850 are used to communicate transactions amongst the collection of systems 802, 804, 806, 808. It should be readily recognized that any number of different types of systems 802, 804, 806, 808 may be provided in accordance with the present invention and incorporated into the system. However, for brevity, not all the different types of commercially available computing devices which are currently in use or in development, in which the system of the present invention may be incorporated, are listed.

In its simplest embodiment, the storage server 850 is simply a dumb storage server and each of the device engines transmits only difference information thereto to be stored in a particular location accessible by other device engines in the system. In one embodiment, each device engine implements all processing required to keep all the systems fully synchronized. Only one device engine needs to be coupled to the storage server 850 at one particular point in time. This permits synchronization of multiple systems in a disconnected fashion. Each device engine will download all transactions encapsulating changes that have occurred since the last synchronization from the server and apply them to the particular device.

The change or difference information ($\Delta$) is provided in one or more data packages, the structure of which is described herein. Each data package describes changes to any and all transfer information across all device engines, including but not limited to application data, files, folders, application settings, and the like. Each device engine can control the download of data packages that include classes of information that apply to the specified local device 802, 804, 806 or 808 attached to that specific device engine. For example, device engine 862 will only need to work with changes to information describing contact names and phone numbers in application data 822, while device engine 866 will be required to work with changes to e-mail, changes to document files, notes, as well as contact and address information since the application data 826 is much more extensive than application data 822.

Each device engine includes compression/decompression and encryption/decryption components which allow encryption and/or compression of the data packages transmitted across Internet connection 710. It should be recognized that compression and encryption of the data packages may be optionally provided. It is not required in accordance with the present invention. Each device engine performs mapping and translation steps necessary for applying the data packages to the local format required for that type of information in the application data stores 822-828. The device engine also includes components which allow it to track ambiguous updates in cases where users have changed data to a particular data field on two different systems simultaneously since the last update. In this case, the device engine includes a mechanism for drawing this to the attention of the user and allowing the user to resolve the conflict.

Device Engine Architecture

FIG. 9A illustrates a single device engine utilized with a generic application 810 and a generic storage server 850. FIG. 9A illustrates a desktop device engine, since all processing occurs on the device and only difference information is transmitted to server 850. Nevertheless, an understanding of the desktop device engine will aid in understanding server side devices engines, hereinafter described. Shown in FIG. 9 are the functional components of a device engine in block form and their interrelationship to each other. The device engine 860 is equivalent to the functional block of a differencing sequencer 104 shown in FIGS. 1-7.

While the invention will be described with respect to the embodiment of the invention as a differencing synchronizer 104, it will be readily understood that portions of the functionality are utilized as needed in a forward-only (a differencing transmitter) or a receive-only (a differencing receiver) capacity as required by the particular application.

As noted above, a device engine exists for each and every device that makes up a user's personal information network of devices in the system. As shown in FIG. 9A, each device engine 860 includes an application object 910. The application object is specific to each particular application 810 and provides a standard interface between the device engine and the balance of the data transmission system of the invention, and the application 810. Details of the application object will be described in further detail below. The application object is a pluggable architecture which supports a wide variety of vendor-unique applications. The job of the application object is to map data from the application into a temporary or "universal" data structure by connecting to the application via any number of standard interfaces to gain access to the applications data. The data structure of the application object puts the data in a generic or "universal data" format which may be used by the device engine components to generate data packages for provision to the storage server.

Also provided is an application object store (AOS) 920 which includes a copy of the device's data at a point just after the previous data extraction and synchronization occurred. Application object store 920 is a mirrored interface which stores a snapshot of the previous state of the data from the application object 910 in the device engine. The size of the AOS will depend on the data being collected by each device engine.

The generic output of the application object is provided to a delta module 950. Delta module 950 is a differencing engine which calculates differences in data between the output of the application object 910 and the copy of the data which is provided in an application object store (AOS) 920. The actual differencing and patch routine can comprise a routine such as XDelta or YDelta. The delta module 950 will be referred to herein alternatively in certain portions of the description as "CStructuredDelta." In addition, the difference information is alternatively referred to herein as a "change log." Each change log (or set of difference information) is a self describing series of sync transactions. As described below, the change log may be encrypted and compressed before output to the network.

Hence, during a sync, the Application Object will, using a mechanism discussed below, extract the data of each application in the device and convert it to a universal data format. The delta module will then generate a difference set by comparing the output of the Application Object and the AOS. This difference information is forwarded to the encryption and compression routines for output to the storage server 850 in the form of a data package. Alternatively, the data from one application can be used to synchronize to data in another application in, for example, a windows environment, as shown by arrow 1050 in FIG. 10.

It should be specifically noted that the application object may interface directly unstructured binary data or with structured application data. The differencing routine supports both uses of the delta module 950 in comparison generation.

In some cases, operation of the application object and delta module is simplified by the fact that some applications, such as PDA's, have the ability to output changes to its data. In such cases, the delta module 950 need only provide the data into the data package, since comparison to an AOS is not required—the application already includes a mechanism for tracking changes made to its own data. However, in many cases the applications provide, at most, a standard interface to access the data, such as Microsoft's OBDC interface, the Microsoft standard Application Programming Interface (API), or other similar standard interfaces.

Device engine 860 further includes a versioning module which applies a version number per object in the data package. As explained further below, each object in the data package is assigned a universally unique ID (UUID). Hence, unlike many prior synchronization systems, the system of the present invention does not sync data solely by comparing time stamps of two sets of data. Versioning module 915 allows each device engine to check the state of the last synchronization against data packs which have been provided to the storage server to determine which data packages to apply. This allows the device engine to sync itself independently of the number of times another device engine uploads changes to the storage server. In other words, a first device engine does not care how many times a second device engine uploads data packages to the server.

An events module 925 controls synchronization initialization events. Items such as when to sync, how to sync, trigger the delta module 950 to perform a synchronization operation.

A user interface 930 is provided to allow additional functional features to a system user of the particular device to which the device engine 860 is coupled. The user interface is coupled to a conflict resolution module 940, a filtering module 945, and a field mapping module 935. Each of the modules provides the functionality both necessary for all synchronization programs, and which users have come to expect.

Filtering module 945 allows filtering for types of content based on, for example, a field level content search. The field mapping module 935 allows for the user to re-map certain interpretations of items which were provided in the document stream. For example, if the device engine 860 is operating on a personal computer, and a synchronization is occurring between the personal computer and a notebook computer, and the user has a "my documents" directory on the personal computer which he wishes to map to a different directory on the notebook computer, the field mapping module 935 allows for this re-mapping to occur. It should be recognized that the field mapping module allows for changes in directing the output of the data package. The field mapping module 935 is not necessary to map particular data fields of, for example, contact information from one application, such as Microsoft Outlook, to a different application, such as Symantec's ACT, as is the traditional use of field mapping and synchronizing applications.

Delta module 950 is further coupled to a compression module 970 and an encryption module 960. It should be recognized that the compression encryption modules need not be enabled. Any type of compression module 970, such as the popular PK Zip or Winzip modules, or those available from HiFn Corporation may be utilized in accordance with the invention. Moreover, any type of encryption algorithms, such as MD5, RCH 6, Two Fish, or Blowfish, or any other symmetric encryption algorithm, may be utilized. In one embodiment of the invention, encryption without compression is used. In a second embodiment of the invention, compression without encryption is used. In a third embodiment of the invention, neither compression or encryption is used, and in a fourth embodiment of the invention, both compression and encryption are used.

Versioning module 915 also allows the device engine 860 to support multiple users with distinct synchronization profiles. This allows multiple users accessing the same machine to each synchronize their own data set using the same device engine. For example, if the application 810 on a particular device comprises Microsoft Outlook on a personal computer, coupled to a Microsoft Exchange server, and Outlook is configured to have multiple user profiles, versioning module 915 will track the data applied through the device engine when a sync request occurs. This allows two users of the same Outlook client software which access different data sets, either in the client computer or on a separate server, to utilize the same device engine and the system of the present invention via the same machine. In a further embodiment, a particular device engine supports the use of foreign devices accessing the system via the same connection. Palm® devices, for example, use a cradle to connect to a computer and/or Internet connection. If a particular user wishes to allow another user to use his Palm® pilot cradle connection to synchronize the other user's Palm® pilot, the device engine can generate data packages to update the local application object store for the foreign device. The application object store can therefore be used as a temporary storage for cases allowing synchronization of foreign devices.

The output of the device engine 900 comprises a data package which is output to storage server 850. As noted above, only one device engine need be connected to the storage server 850 at a given time. The data package can be stored on the storage server 850 until a request is made to a particular location of the storage server by another device engine. Likewise, delta engine 900 can query alternative locations on the storage server for access to synchronized data within the system of the present invention. Access to areas of the storage server is controlled by a management server (MS) described more fully below. In one embodiment, each sync operation requires that the device engine for each device login to the management server to authenticate the device and provide the device engine with the location of the individual device's data packages on the storage server.

Data packages may be advantageously provided to the device engine from the storage server in a streaming format, allowing processing to occur using a minimum of bandwidth and storage in the devices. The device engine 860 and particularly the delta module 950 interpret data packages based on the versioning information and the mirrored data present in the application object store 920. When data is returned to the delta module 950 from the storage server 850, the delta module returns differenced data to the application object 910 for the particular application which then translates the delta information into the particular interface utilized for application 810. Once a device engine has been fully applied all data packages from an input stream, it generates a series of data packages that describe the changes made on the local system. The device engine uses the local application object store 920 to keep track of the last synchronized version of each application's actual data, which is then used for the next data comparison by the delta module on the next sync request. Generated data packages can include operations and encode changes generated from resolving ambiguous cases as described above.

FIG. 9B depicts how server based device engines may be provided in the system of the present invention. The Palm® device example is shown in this embodiment, where the Palm® device has the capability of connecting directly to the Internet and a service provider's data center 900. The data center includes a firewall 975 to prevent unauthorized communications with servers resident in the data center 900 and protect integrity of the data. The storage server 850 may communicate directly through the firewall as may the management server (MS) 1410.

Shown therein are two sync servers 982 and 984 each of which is dedicated to syncing one particular type of application. Sync server 982 is dedicated to the Palm® device, while sync server 980 is dedicated to, for example, a portal application (Portal1).

Since the Palm® Device 804*a* includes a mechanism for transmitting changes to its data directly, data may be transmitted using HTTP request and response via the firewall 975 to the sync server 982 where differencing and updating of data in the AOS can occur, after which changes can be downloaded to the Palm® 804*a*.

The synchronization server is an application handles concurrent synchronization of user's data. Each Sync Server includes plug-in support for multiple devices to be synchronized using the same sync server executable. Each device type has it's own device name that identifies which AO/AOS components will be used during the sync.

The sync server uses the concept of a universal data record in its internal sync differencing engine and when sending data to and retrieving from external entities such as the AOS and AO. Hence, in the Palm® application, the job of a server AO is simply to take the device-specific format of its record and convert into a universal record format.

The Sync Server has a plug-in architecture so that 3rd party application partners can easily add their services into the server. Currently, if the server is operated in a Microsoft Windows NT Server, the sync server discovers the sync components via the Windows NT registry. In alternative embodiments, this function is performed in a Component Manger which operates on each sync server to manage processing by each of the AO and AOS on the server. Each AO and AOS are implemented as a stand-alone DLL that the Sync Server loads at initialization time, or when adding a new component via the Component Manager.

Each sync server is shown as dedicated to a single application. However, a sync server may handle multiple device types.

In the embodiment of FIG. 9B, it should be noted that, depending on the device type, there are different configurations for the AOS and AO's. For example, the Palm®'s AO data store 1050 resides on the Palm® device 804*a* itself and a separate AOS data store 1052 exists for this configuration (an Oracle database). In the case of Portal1, the AOS and AO use the data store 1054.

Device engines can generate additional data packages intended to resolve synchronization problems in other systems. For example, interfacing with the conflict resolution module 940, if the user makes a change to a particular data store on an application object on his Palm® pilot, then makes an additional change to a personal information manager (PIM) application on his personal computer, the user can specify that the change made on the personal computer will "win" when the conflict is detected by the Δ engine and the versioning information between the two devices. This is essentially a definition that one particular set of data is correct and should replace the second set of data.

Figure 10:
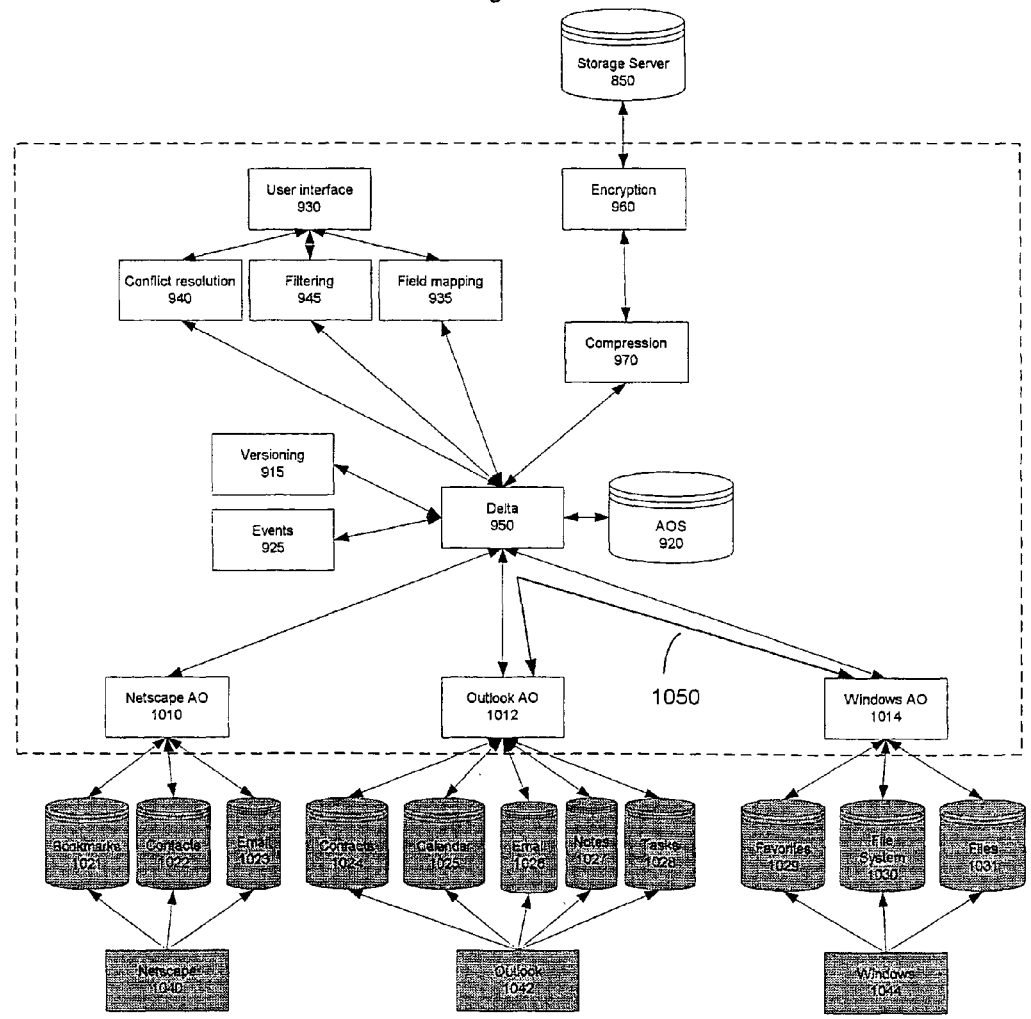
FIG. 10 is a block diagram of one embodiment of the device engine in an operating system such as Windows.

FIG. 10 shows a specific embodiment of a desktop device engine utilized in, for example, a Microsoft Windows-based operating system environment.

As shown in FIG. 10, a Windows operating system may have at least three specific applications which may require synchronization. In FIG. 10, the system includes Netscape Communicator application 1040 having data such as bookmarks 1021, contacts 1022, and e-mail 1023; a Microsoft Outlook application 1042 which includes contact information 1024, calendar information 1025, e-mail information 1026, note information 1027, and tasks information 1028; and Windows operating system 1044 information including Favorites data 1029, file system information 1030, and individual files 1031.

Each particular application 1040, 1042, 1044 has an associated application object 1010, 1012, 1014. Each of the respective application objects provides data back to delta module 950 in a generic format which is usable by the delta module in accordance with the foregoing description of the apparatus shown in FIG. 9A. From FIG. 10, it will be additionally seen how the delta module 950 may be utilized to synchronize data between applications running on the same particular server. The device engine hence does an intra-system sync such as, for example, between the contact information 1022 from Netscape and the contact information 1024 from Outlook.

FIG. 10 further illustrates the modularity of the system of the present invention allowing the device engine to include any number of different application objects to be provided on a single device to incorporate all applications run on that device.

In operation, during an installation of a device engine into a particular system, the installation program may be tailored to provide application objects which may be present on a given system. For example, and with reference to FIG. 10, the installation program for a Windows machine will carry any number of application objects for systems and applications which may be present on a Windows machine. The installer will check for the presence of given applications, and allow the user to add additional applications which may be installed in locations that are not the normal default installation areas for application support by the application objects which the installer is carrying, or de-select certain applications which, for one reason or another, the user may not wish to install an application object for and render a part of the system of the present invention.

Application Object Structure

Figure 11:
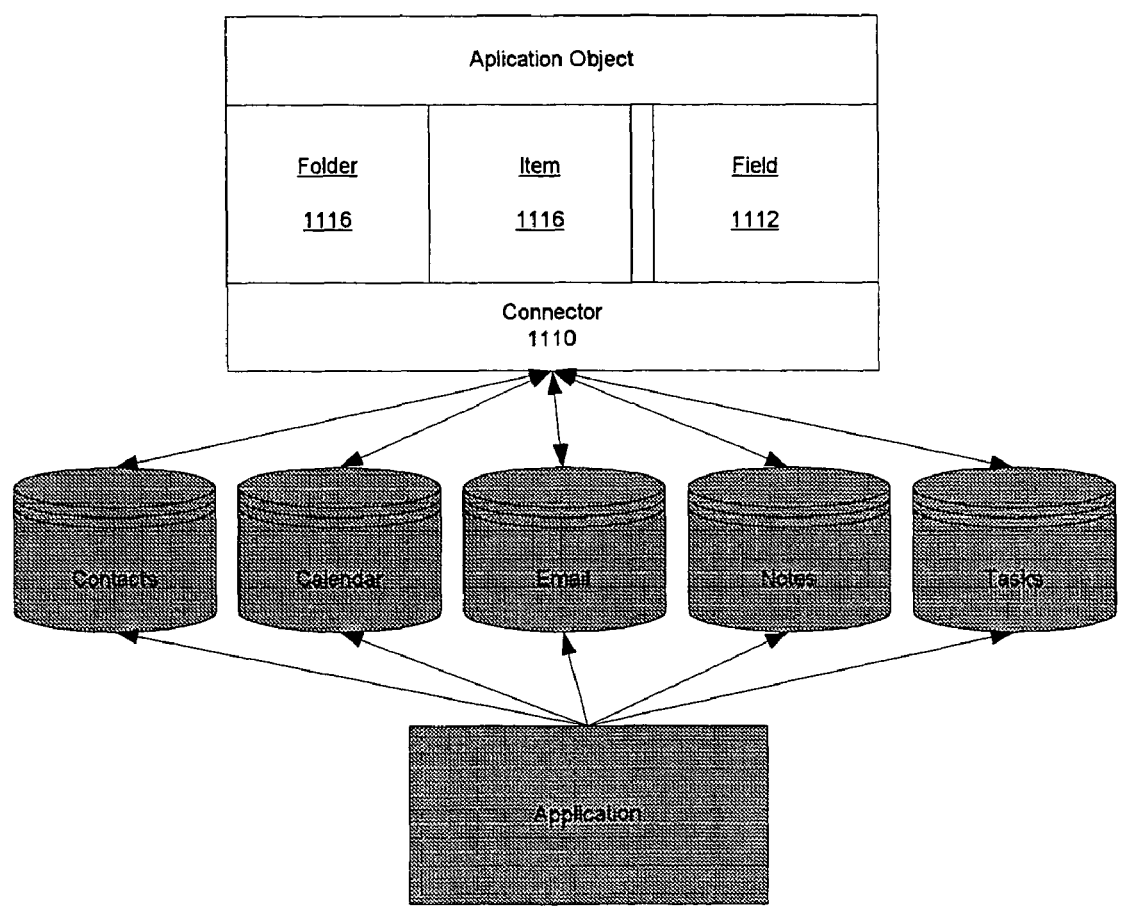
FIG. 11 is a block diagram of an application object incorporated into the device engine of the present invention.

FIG. 11 is a conceptual depiction of the structure of an application object. As noted above, the application object is a pluggable architecture which supports a wide variety of vendor-unique applications. The consistent and scalable architecture of the system of the present invention for device engines is maintained by encapsulating system-dependent knowledge in a single component, i.e. the application object. As noted above, every application object supports a standard set of interfaces that every device engine understands. Each application object maps these standard interfaces of the capabilities of a particular vendor application. Hence, there will be as many application objects as there are application types.

As noted above, there are different types of server and desktop device engines, some having application objects entirely on the server, while others have application objects entirely on the desktop.

Each application object will include a connector 1110 which may comprise a generic interface to the particular application for which the application object store has been designed. For example, when connecting to a Palm® device, the connector will be an HTTP protocol request routine which interfaces with the Palm® device's own built-in synchronization manager, which provides an output of records which have been changed on the Palm® device. As in FIG. 9B, since the Palm® outputs all the changes to its data via its own sync manager, in the Palm® application, the job of a server AO is simply to take the device-specific format of its record and convert into a universal record format.

The connector provides access for the application object to remove the data field from a particular application and convert it to a universal record structure. In the desktop AO, where, for example the application object is designed for a Windows interface, the connector may be the Windows API and the job of the AO will be to translate data from, for example, the windows file system to a universal data format. This universal data structure is then used by the delta module 950 to build data packages to be used in synchronization between components of the systems provided in the network system of the present invention.

Universal data structure mapping, used on desktop application objects, and universal data record mapping, used by the server device engines, is further detailed below.

Desktop Application Object

Each Application Object (AO) is a software component that interfaces with the third party application APIs (Application Programming Interface) to provide the programming services to the delta module for extraction and deposition of information data from and to the third party application domain during synchronization. In addition, the AO maps the third party application data fields to system's domain.

The AO service is a collection of COM (Component Object Model) objects that can be developed in conjunction with the third party Windows application APIs as a form of a DLL (Dynamic Linked Library) in C or C++. The DLL is loaded on demand at runtime during synchronization. It should be recognized that the application object need not be implemented using the COM model, but may be developed with other distributed object models.

There are a number of the related subsystems and documents that the developer must be familiar with and this document has made many references to those subsystems during the course of presenting the AO.

Change Log (CL) (or differencing information), a data file which contains a series of synchronization transactions.

DataPack, a compacted and encrypted Change Log.

StructuredDelta, the delta module differentiation engine that generates differences between Application Objects and Change Log and AOS.

AOS, a database which resides locally on, for example, a windows machine.

MS, a management server that manages users' accounts.

SS, an FTP or storage server that manages data packs.

User Manager, a standalone Windows client UI program that manages the synchronization process.

ePortal, a web-based PIM portal site.

pio_types.h, a header file which contains the definitions of the system's supported data fields known as tags.

Def.h, a header file contains the definitions of the system's constants.

interfaces.h, a COM interface file contains AO interface definitions.

Each AO has a COM interface-based design built-in. That is, instead of providing a set of traditional APIs as programming services, it provides a set of interface-based objects as programming services.

StructuredDelta, the delta module, the primary intended user of each AO. StructuredDelta instantiates these COM objects and uses them throughout the synchronization session exclusively through the COM interfaces on those objects to interface with the third party application database.

Each AO component consists of a set of objects that translate the third party application data into the universal data middle format which underpins the entire spectrum of PIM data regardless of which third-party application the data comes from. The objects in universal data format are device, (application) data class, store, folder, item, and data fields. The AO digests the third party application data of any kind and reduces it into a few handful simple objects and field types. These objects and field types are fed into Structured-Delta engine and are compared by StructuredDelta in order of their hierarchy. The resulting differences (add, delete, modify) are logged as transactions in the difference information. The data packs are transported to a storage server that may be actively managed by a management server for each individual user account and devices.

StructuredDelta uses AO objects to access and modify the individual AO objects and data fields. AO objects serve as a buffer between individual application data and Structured-Delta so that StructuredDelta does not require knowledge of each application and database. All AO objects are temporary and created in the space of each AO by StructuredDelta through COM interfaces. AO objects are referenced when they are in use and they are freed when StructuredDelta stops using them. One can think of AO objects as merely placeholders of each application objects for StructuredDelta to access. Once StructuredDelta has a particular Application's data, StructuredDelta would free AO objects immediately without storing them internally.

AppObj

AppObj is a root object of each AO component and there is one and only one per AO. AppObj provides an entry point into the individual application's database. StructuredDelta instantiates it and holds it on during the entire synchronization session and releases it afterward. AppObj offers a number of services such as what class of data it supports. The C++ example of AppObj's definition is shown below:

```
class CMyF1AppObj :
    public      Item,
    public      AppObj,
    protected   ModuleIdentity,
    protected   DataClassInfo,
    protected   ItemTypeInfo,
    protected   ItemFieldMap,
    protected   FolderInfo,
    protected   DataFileInfo,
    protected   SynchNotify,
    protected   ErrorMsg,
    protected   EnumItems,
    protected   FindItem,
    protected   ModifyItem
{
```

```
public:
    CMyAppObj( HWND hWndParent );
    ~CMyFppObj( );
};
```

AppObj can contain children objects. They are Store objects. EnumItems interface is used to enumerate Store objects. FindItem interface is used to find the contained objects. ModifyItem interface enables AppObj to create a new Store object. AppObj is created by Structured Delta calling CreateAppObject(HWND hWndParent, AppObj **ppObj).

Store

The Store object represents a database of the individual application information. If the individual application can handle multiple databases at same time, one needs multiple Store objects. One can think of Store object as a specialized Folder object, the root folder of each particular application data domain. The C++ example of Store's definition is shown below:

```
class CMyStore :
    public      Item,
    public      ItemContainer,
    protected   EnumItems,
    protected   FindItem,
    protected   FindItemByData,
    protected   ModifyItem,
    protected   ReadWrite
{
    CMyStore( );
    ~CMyStore( );
};
```

Store is a container of Folder objects. EnumItems interface enables the enumeration of its contained folders while FindItem and FindItemByData interface is used to find contained Folders or Item objects. ModifyItem and ReadWrite interface enables the modification of each application database.

Folder

Folder object is a specific data class of each individual application such as a table in the relational database or a collection of data records in each application. For example, the applications contact collection can be thought as a Folder object. The C++ example of Folder's definition is shown below:

```
class CMyFolder :
    public      Item,
    public      ItemContainer,
    protected   EnumItems,
    protected   FindItem,
    protected   FindItemByData,
    protected   ModifyItem,
    protected   ReadWrite
{
public:
    CMyFolder( );
    ~CMyFolder( );
};
```

Folder object is also container. It can contain Item objects as well as Folder objects. EnumItem interface allows the enumeration of either Folder objects or Item objects or both.

FindItem and FindItemByData interface is used to find contained Folder objects or Item objects. ModifyItem and ReadWrite interface enables the modification of an application's data tables.

Item

Item object represents an individual entity of each application's domain specific data. Item object can be thought as a record of each application's relational table. For example, a contact, email, calendar, to-do item in the particular application can be thought of as an Item object. The C++ example of Item's definition is shown below:

```
class CMyItem :
    public          Item,
    protected       EnumItems,
    protected       FindItem,
    protected       ModifyItem,
    protected       ReadWrite
{
public:
    CMyItem( );
    ~CMyItem( );
};
```

Item can contain Attachment objects only. EnumItems interface enables the enumeration of Attachment objects if any. ModifyItem and ReadWrite interface enables the modification of an application's records or data fields.

Attachment

Attachment object is a specialized Item object that encapsulates an attachment data or relationship. Only Item can have Attachment objects. Attachment object can be thought as attachment data such as attached-email files. Attachment can also be thought as attachment relationship to other Item objects. The example of that is the distribution list (Item object) can contain contacts (Item objects). The C++ example of Item's definition is shown below:

```
class CMyItemAttachment :
    public          Item,
    protected       ReadWrite,
    protected       ModifyItem
{
public:
    CMyItemAttachment( );
    ~CMyItemAttachment( );
};
```

Variant

Variant object represents a data field of each particular application data. For example, a 'first name' of a contact or the birthday date of a contact can be thought as Variant object. StructuredDelta only understands Variant object and the types of data fields it encapsulated. Variant object can contain any one of the following data field type:

```
struct Variant
{
    enumFieldTag        tag;
    enumFieldDataFlag   flag;   // flags item fields as not
known or otherwise special
    union
    {
        short int       i;      // eFieldType_WORD
        LONG            l;      // eFieldType_LONG
        DWORD           dw;     // eFieldType_DWORD
        unsigned_int64  qw;     // eFieldType_QWORD
        UUID            uuid;   // eFieldType_UUID
        DATE            time;   // eFieldType_DATE
        LPTSTR          psz;    //
eFieldType_String
        Binary          bin;    // eFieldType_Binary
        Float           flt;    // eFieldType_Float
        Double          dbl;    //
eFieldType_Double
        F1Collection    coll;   //
eFieldType_Collection
    } Value;
    Stream*             strm;   // eFieldType_Stream
};
```

Variant::tag is an identification tag of data field and variant::flag specifies the type of data field while Variant::value member variable stores each application's field value. One data field type is Collection. Collection object is an array of Variant objects. It can be used to represent a compound data fields.

```
struct Collection
{
    ULONG           cValues;
    struct_Variant** paVar;     // This array really
contains cValues entries
};
```

Another data field type that is worth exploring is Binary. Binary object can be used to represent a binary data as it is.

```
struct Binary
{
    ULONG           cb;
    LPBYTE          lpb;
};
```

AO Interfaces

Each AO object has an AO COM interface. Each object must implement some of those interfaces to create certain capability or desired behavior that are expected by Structured Delta.

IItem

This is the base interface of all application objects. It provides the identification service to StructuredDelta. Every object must have a unique ID, parent unique ID, display name, and item type information (eItemType_FOLDER, eItemType_CONTACT, etc). The unique ID is a unique string only in a given device. It is not persistent cross the Internet to other devices. The ID usually comes from the third party application database domain such a unique ID of a record.

interface IItem: IUnknown
{
  STDMETHOD_(LPCTSTR, GetUniqueID) ( ) const PURE;
  STDMETHOD_(LPCTSTR, GetParentUniqueID) ( ) const PURE;
  STDMETHOD_(LPCTSTR, GetDisplayName) ( ) const PURE;
  STDMETHOD_(enumItemType, GetItemType) ( ) const PURE;

```
    STDMETHOD_(BOOL, IsContainer) ( ) const PURE;
    STDMETHOD_(DATE, GetLastModificationTime) ( )
        const PURE;
    STDMETHOD_(QWORD, GetSize) ( ) const PURE;
    STDMETHOD_(DWORD,     GetFlags)    (    )
        const PURE;
};
```
IItemContainer This is the base interface of all application container objects (store, folder). These container objects must have this interface implemented so that StructuredDelta would recursively descend in them if they have IItemContainer capability.
```
interface IItemContainer: IItem
{
    STDMETHOD_(BOOL, ContainsItemType) (enumItem-
        TypeeItemType) PURE;
    STDMETHOD_(BOOL, ContainsDataClass) (enumData-
        Class eDataClass) PURE;
    STDMETHOD_(enumSpecialFolderType,   GetSpecial-
        FolderType) ( ) PURE;
    STDMETHOD_(GUID, GetMappingGUID) ( ) PURE;
};
```
IErrorMsg This is an error-reporting interface for every application object. It is used by StructuredDelta to query the error string after a failure. The AO should implement this on every object after the error occurs and before returning the control to StructuredDelta.
```
    interface IErrorMsg: IUnknown
    {
        STDMETHOD(GetErrorString) (LPTSTR pszError, int
            iBufLen) const PURE;
    };
```
IEnumItems This is an interface for collection enumeration, used by StructuredDelta to enumerate the objects of the third party application database. IEItemEnumFlags (eItemEnumFlags_FOLDER, eItemEnumFlags_ITEM, and eItemEnumFlags_ATTACHMENT) is used to enumerate only the requested type of objects.
```
    interface IEnumItems: IUnknown
    {
        STDMETHOD(ItemQueryStart) (enumItemType type,
            long &lCount, eItemEnumFlags dwFlags) PURE;
        STDMETHOD(ItemQueryNext)    (Item    **ppItem)
            PURE;
        STDMETHOD(ItemQueryFinish) ( ) PURE;
    };
```
IFindItem This is an interface for recursively finding object within the third party application database, used by StructuredDelta to find application object by its unique ID.

```
    interface IFindItem : IUnknown
    {
        STDMETHOD(FindStoreByID) ( LPCTSTR pszUniqueID,
            ItemContainer **ppFolder ) PURE;
        STDMETHOD(FindFolderByID) ( LPCTSTR pszUniqueID,
            ItemContainer **ppFolder ) PURE;
        STDMETHOD(FindItemByID) ( LPCTSTR pszUniqueID,
            Item **ppItem ) PURE;
    };
```

IFindItemByData

This is an interface for recursively finding the object that matches the search criteria data. The search criteria are represented as Collection that allows the multiple search field keys to be used during the search. The multiple objects may be found that match the search criteria. The interface also provides enumeration capability of the search results.
```
    interface IFindItemByData: IUnknown
    {
        STDMETHOD(FindByDataStart)     (enumItemType
            type, Variant* pSearchKey, int* pnFound) PURE;
        STDMETHOD(FindByDataNext) (LPTSTR pszEn-
            tryID, int cbBufSize) PURE;
        STDMETHOD(FindByDataFinish) ( ) PURE;
    };
```
IModifyItem This is an interface for StructuredDelta to add, delete, and re-parent application data in the third party database during synchronization.
```
    interface IModifyItem: IUnknown
    {
        STDMETHOD(Add) (BOOL bFolder, enumItemType
            type, Item **ppItem) PURE;
        STDMETHOD(Delete) ( ) PURE;
        STDMETHOD(Move) (ItemContainer * pDestFolder)
            PURE;
    };
```
IReadWrite This is an interface for accessing, writing, and mapping the third party application data fields by StructuredDelta. It provides the capability of read and write data fields from and to the third party application database and the capability of mapping data field of the third party application to universal data format of the system of the present invention. Any object that has data fields and require field level synchronization must implement this interface.
```
    interface IReadWrite: IUnknown
    {
        STDMETHOD(Read) ( ) PURE;
        STDMETHOD(Commit) ( ) PURE;
        STDMETHOD(GetFieldData) (enumFieldTag field-
            Tag, Variant **ppVariant) PURE;
        STDMETHOD(ReleaseFieldData) (Variant *pVariant)
            PURE;
        STDMETHOD(SetFieldData) (const Variant *pVariant)
            PURE;
    };
```
IAppObj This is an AppObj only interface. It provides the capability of logon and logoff to the third party applications during synchronization. The data class filter mechanism is used by StructuredDelta to filter the enumeration of contained data classes (eDataClass_CONTACT, eDataClass_CALENDAR, etc).

```
    interface IAppObj : IUnknown
    {
        STDMETHOD(Logon) ( HWND hWndParent ) PURE;
        STDMETHOD(Logoff) ( ) PURE;
        STDMETHOD(SetFilter) ( const VOID* pFilter, int BufLen )
            PURE;
        STDMETHOD_(int, GetFilter) ( VOID* pFilter, int BufLen )
            PURE;
    };
```

IModuleIdentity

This is an AppObj only interface. It provides DLL module identification information to the Manager object such as the name of the third party application, enum ID of this application, and the application installation detection support.

```
interface IModuleIdentity: IUnknown
{
    STDMETHOD(GetName) (LPTSTR pszName, int
        iBufLen) const PURE;
    STDMETHOD(GetAppl) (Appl *pAppl) const PURE;
    STDMETHOD(IsInstalled) (BOOL *bIsInstalled)
        const PURE;
};
```

IItemTypeInfo

This is an AppObj only interface. It provides the information on the number of item types supported by AO, what type items are supported and the capabilities for a specific item type. This returns a DWORD containing bits set.

```
interface IItemTypeInfo: IUnknown
{
    STDMETHOD(GetSupportedTypesCount)   (int   &
        iCount) PURE;
    STDMETHOD(GetSupportedTypeInfo) (int iIndex,
        enumItemType &type, LPTSTR pszTypeName, int
        iBufLen) PURE;
    STDMETHOD(GetItemTypeCaps)    (enumItemType
        type, DWORD &dwFlags) PURE;
};
```

IDataClassInfo

This is a CAppObj only interface. It provides the information on the number of data classes that are supported by the application object and what the data classes are supported

```
interface IDataClassInfo: IUnknown
{
    STDMETHOD(GetCount) (int *piCount) PURE;
    STDMETHOD(GetDataClass) (int iIndex, enumData-
        Class *peDataClass) PURE;
};
```

IDataFileInfo

This is a CAppObj only interface, it provides information on the number of database files and database filenames supported by AO to avoid being synched twice by application sync and file-set sync.

```
interface IDataFileInfo: IUnknown
{
    STDMETHOD(GetDataFileCount)   (int   *piCount)
        PURE;
    STDMETHOD(GetDataFilePath) (int iIndex, LPTSTR
        pszFilePath, int iBufLen) PURE;
};
```

IItemFieldMap

This is a CAppObj only interface that is used by StructuredDelta to query the data fields of given application object. For example, what are data fields in application object called eItemType_CONTACT?

```
interface IItemFieldMap: IUnknown
{
    STDMETHOD(FieldQueryStart) (const enumItem-
        Type &type, int &iCount) PURE;
    STDMETHOD(FieldQueryNext)    (enumFieldTag   &
        field, LPTSTR pszName, int iBufLen, LPTSTR psz-
        Type, int iTypeBufLen)PURE;
    STDMETHOD(FieldQueryFinish) ( ) PURE;
};
```

IFolderInfo

This is a CAppObj only interface, used by StructuredDelta to obtain the special and default folders' unique IDs and UUIDs.

```
interface IFolderInfo: IUnknown
{
    STDMETHOD(GetSpecialFolderID)    (enumSpecial-
        FolderType eFolder, LPTSTR pszUniqueID, int iBu-
        fLen) PURE;
    STDMETHOD(GetDefaultFolderID) (enumItemType
        type, LPTSTR pszUniqueID, int iBufLen) PURE;
    STDMETHOD(MapFolderGUID) (UUID uuidFolder,
        LPTSTR pszUniqueID, int iBufLen) PURE;
};
```

IFastSync

This is a CAppObj only interface that is used by StructuredDelta to query if the given AO also provides FastSync service or not. FastSync is a DLL component that is written using the third party APIs and loaded into the third party application to receive the changes in database while users are operating the application. It is used to speed up the synchronization performance by syncing only the objects that are known to IFastSync component.

```
interface IFastSync: IUnknown
{
    STDMETHOD(GetFastSync) (enumDataClass eData-
        Class, BOOL* pbFastSync) PURE;
};
```

SynchNotify

This is a CAppObj only interface that is called by Manager to notify the third party application the state of synchronization: start, finished, or reset so that the application can prepare itself accordingly.

```
interface ISynchNotify: IUnknown
{
    STDMETHOD(SynchNotify) (enumSynchNotify eNo-
        tify) PURE;
};
```

Server AO

Server Application Objects share many characteristics with desktop application objects, including support for reading and mapping to the universal record structure set forth above.

Nevertheless, among various devices incorporated into the system of the present invention, each application object database will be quite different. For example, the Palm® database on the device is really just a memory space with records laid out sequentially in memory. In a web portal-type application, the application object may be an Oracle database. Server application objects may generally have less difficult tasks since the applications supported are generally either devices providing their own change data output, (such as Palm®-type PDA's), or which do not have a great deal of data to export (such as cell phones, having only name and number information).

Nevertheless, each application object must support all calls defined in a class interface definition as follows:

| FUNCTION | DESCRIPTION |
| --- | --- |
| Open | Perform an initialization of the device before data retrieval functions are called. |
| Close | Done with database calls, cleanup if necessary. |
| Get First Modified Record | Get the first modified record from the device and insert into application object. |

-continued

| FUNCTION | DESCRIPTION |
| --- | --- |
| Get Next Modified Record | Get the next modified record from the device and insert into the application object. |
| Add Record | Add a record into the application object database. |
| Update Record | Update a record. |
| Delete Record | Delete a record in the application object database. |
| Set Device Records | A function called during the synchronization manager to send a bytestream to the application object for interpretation. The bytestream will contain a list of records to add to the application object modified records list. At a later point in time, such records will be retrieved by the Get First Modified Record/Get Next Modified Record functions. |
| Get Device Records | For records bound to the device, this call gets a bytestream that contains a list of records to add back to the device. There is an outbound record list that is saved until this call is finished, at which time the sync server will be finished with the application object. |
| Set Device Response | A function used to modify or repair a record input saved in the application object store that was sent to the device in the Get Device Records call, such as a record ID for a record. If 10 records were sent to the device during the Get Device Records call, one would expect to see 10 records coming back in during this function call. |

As noted above, because each application object database is different, the calling convention and the application object itself will likewise be different. The calling convention for a Palm® device's sync manager application object is given in the following pseudo-code:
Call AO::Open
Call AO::WriteRecords
Start synchronization process
While more records in AO Data Object
   Call AO::GetFirstModifiedRecord( )
   Call AO::GetNextModifiedRecord( )
END
IF new records THEN
   Call AO::AddRecord( )
IF deleted records THEN
   Call AO::DeleteRecord( )
IF update record THEN
   CALL AO::UpdateRecord( )
Call AO::Close
As shown therein, the calling convention is designed to be integrated with the Palm's® own sync manager.

A second example provided below shows mapping of a portion of a web portal's contact database:

```
MappingItem CContactTable::m_FieldMap[ ] =
{
    {1,    eFieldTag_Contact_FirstName,        "firstname"},
    {1,    eFieldTag_Contact_MiddleName,       "middlename"},
    {1,    eFieldTag_Contact_LastName,         "lastname"},
    {1,    eFieldTag_Contact_Title,            "title"},
    {1,    eFieldTag_Contact_Suffix,           "suffix"},
    {1,    eFieldTag_Contact_Anniversary,      "anniversary"},
    {1,    eFieldTag_Contact_Birthday,         "birthday"},
    {1,    eFieldTag_Contact_AssistantName,    "assistantname"),
    {1,    eFieldTag_Contact_Children,         "children"},
    {1,    eFieldTag_Contact_CompanyName,      "companyname"},
    {1,    eFieldTag_Contact_Department,       "department"},
    {1,    eFieldTag_Contact_FTPSite,          "ftpsite"},
    {1,    eFieldTag_Contact_Gender,           "gender"},
    {1,    eFieldTag_Contact_JobTitle,         "jobtitle"},
    {1,    eFieldTag_Contact_ManagerName,      "managername"},
    {1,    eFieldTag_Contact_NickName,         "nickname"},
    {1,    eFieldTag_Contact_Office,           "office"},
    {1,    eFieldTag_Contact_Profession,       "profession"},
    {1,    eFieldTag_Contact_Spouse,           "spouse"},
    {1,    eFieldTag_Contact_SelectedMailingAddress,
           "selectedmailingaddress"}
};
int CContactTable::m_nNumFields =
sizeof(m_FieldMap)/sizeof(MappingItem);
HRESULT CPortalAddrOCI::InsertRecord( MappingItem theMap[ ], int
numFields, CDataAccessor *pInsertItem, CF1ItemUniversal *pUnivItem,
bool bForceCreate )
{
    bool bHasData = SetRecordFields( theMap, numFields,
pinsertItem, pUnivItem );
    if( bHasData || bForceCreate )
    {
    // Insert the record into the database and execute the command
        pInsertItem->InsertRow(0);
        pInsertItem->Exec( );
    }
    return S_OK;
}
```

The above example of mapping the contact field files maps contact fields from a particular web contact information database to fields in the universal record format from the master list header file (pio_types.h) in the system of the present invention. This mapping is for a specific contact table and it should be understood that other information, such as phone numbers, e-mail addresses, and other contact information may be stored in a separate table.

Once data is extracted from a particular application, the server application object must then convert the information into the universal record format which can be utilized by other server device engines to take content information into their own particular application.

Universal Record Format

The universal record format is used by each server device engine to handle various tasks of encapsulating records in a common format, comparing records, creating and holding differences between records, and other tasks of synchronization.

The universal record format allows the application objects to support a wide range of extensible application item types such as contacts, calendar, mail, bookmarks, and the like. Flexible type name and value associations permit synchronization without regard to individual vendor application information formats. Each application object encapsulates mapped knowledge from the vendor unique format to the universal format of the present invention. As such, an application object can be designed to support any combination of application and binary information types. In essence, application objects can be designed to support a vendor application using only binary file synchronization if the internal format of the application is not known.

Server application objects can also be designed to create collections. For example, if the user wishes to create a "my pictures" collection which consists of some collection of information and synchronize this collection of information, such an arbitrary grouping of classes of information into appropriate representations is supported.

Because the connector layer of the interfaces to the actual storage with a vendor application varies with application type, application access methods can include, but are not limited to, disk or database access, network protocols, wireless device protocols, and the like.

The Universal Records Format and the Universal Field Format class definitions are given below:

```
typedef map < enumFieldTag, CUniversalField, less_enumFieldTag >
UniversalRecordMap;
typedef UniversalRecordMap::value_type UniversalRecordPair;
typedef UniversalRecordMap::iterator UniversalRecordIterator;
typedef UniversalRecordMap::const_iterator
ConstUniversalRecordIterator;
class CUniversalRecord
{
private:
    UniversalRecordMap recordMap_;
public:
    bool conflicts(const CUniversalRecord& rhs);
    bool add(const CUniversalRecord &rhs);
    bool subtract(const CUniversalRecord& rhs);
    CUniversalRecord( );
    CUniversalRecord( const CUniversalRecord& rhs );
    virtual ~CUniversalRecord( );
    // add this element
    HRESULT insert( enumFieldTag eId, long value,
enumFieldDataFlag flag = eFieldDataFlag_Normal);
    HRESULT insert( enumFieldTag eId, LPCTSTR value,
enumFieldDataFlag flag = eFieldDataFlag_Normal);
    HRESULT insert( enumFieldTag eId, DATE value,
enumFieldDataFlag flag = eFieldDataFlag_Normal);
    HRESULT insert( enumFieldTag eId, string value,
enumFieldDataFlag flag = eFieldDataFlag_Normal);
    HRESULT insert( UniversalRecordPair p );
    CUniversalRecord exclusiveLeftWins( CUniversalRecord& rhs );
    CUniversalRecord inclusiveLeftWins( CUniversalRecord& rhs );
    bool removeSame(const CUniversalRecord &rhs);
    bool Find( const enumFieldTag eId, CUniversalField &field );
    UniversalRecordMap::iterator find( const enumFieldTag eId ) {
    return recordMap_.find(eId); }
    UniversalRecordMap::iterator begin( )           { return
recordMap_.begin( ); }
    UniversalRecordMap::iterator end( )             { return
recordMap_.end( ); }
    bool empty( )                                    { return
recordMap_.empty( ); }
    long size( )                                     { return
recordMap_.size( ); }
    UniversalRecordMap::iterator erase(UniversalRecordMap::iterator&
it)
        { return recordMap_.erase(it); }
    void clear( )                      { recordMap_.clear( ); }
};
```

The UniversalField Structure

```
class CUniversalField
{
public:
    enum eUniversalField
    {
        eUF_Unknown,
        eUF_Long,
        eUF_String,
        eUF_Date,
        eUF_Blob
    };
protected:
    eUniversalField         typeId_;
    enumFieldTag            fieldId_;
    enumFieldDataFlag       flag_;
    size_t                  len_;
    union
    {
        long l;
        DATE d;
        TCHAR* pCh;
    } value_;
public:
    CUniversalField( );
    CUniversalField( const CUniversalField& rhs );
    CUniversalField( enumFieldTag itemId, long value,
enumFieldDataFlag flag = eFieldDataFlag_Normal);
    CUniversalField( enumFieldTag itemId, DATE value,
enumFieldDataFlag flag = eFieldDataFlag_Normal);
    CUniversalField( enumFieldTag itemId, LPCTSTR value,
enumFieldDataFlag flag = eFieldDataFlag_Normal);
    CUniversalField( enumFieldTag itemId, string blob,
enumFieldDataFlag flag = eFieldDataFlag_Normal);
    ~CUniversalField( );
    bool operator==( const CUniversalField& rhs ) const;
    bool operator!=( const CUniversalField& rhs ) const { return
        !operator==(rhs); }
    CUniversalField& operator={ const CUniversalField& rhs};
    eUniversalField getType( ) const       { return typeId_; }
    enumFieldTag getFieldID( ) const       { return fieldId_; }
    enumFieldDataFlag getFlag( ) const     { return flag_; }
    size_t getLength( ) const              {return len_; }
    LPCTSTR getString( ) const             { ASSERT ( eUF_String ==
        typeId_); return value_.pCh; }
    long getLong( ) const                  { ASSERT ( eUF_Long ==
        typeId_); return value_.l; }
    DATE getDate( ) const                  { ASSERT ( eUF_Date ==
        typeId_); return value_.d; }
    string getBlob( ) const                { ASSERT ( eUF_Blob ==
        typeId_); return string(value_.pCh,len_); }
    void get( LPCTSTR& p ) const           { ASSERT ( eUF_String ==
        typeId_); p = value_.pCh; }
    void get( long& l) const               { ASSERT ( eUF_Long ==
        typeId_); l = value_.l; }
    void get( DATE& d) const               { ASSERT ( eUF_Date ==
        typeId_); d = value_.d; }
    void get( string& b) const{ ASSERT( eUF_Blob ==
typeId_); b.assign(value_.pCh,len_); }
    bool isString( ) const                 { return typeId_ ==
        eUF_String; }
    bool isLong( ) const                   { return typeId_ == eUF_Long; }
    bool isDate( ) const                   { return typeId_ == eUF_Date; }
    bool isBlob( ) const                   { return typeId_ == eUF_Blob; }
};
```

Example

An example of how data is removed from one particular application data type and converted into the universal record format is given below for an Oracle database:

```
#include "stdafx.h"
#include <string>
using namespace std;
#include "F1ItemUniversal.h"
#include "oci.h"
#include "OCIDefs.h"
#include "OCIConnect.h"
#include "OCISession.h"
#include "OCIColumn.h"
#include "OCICursor.h"
#include "DataAccessor.h"
#include "UniversalMapper.h"
```

```
#include "UniversalRecord.h"
#include "F1Util.h"
#include "BaseAOSTableOCI.h"
/*
 * Function: MapFields
 * Description: Map fields from an Oracle database record into an
 UniversalRecord format.
 */
void CBaseAOSTableOCI::MapFields( CDataAccessor *pAccessor,
 MappingItem theMap[ ], int numFields, CUniversalRecord &univRec )
{
    string sValue;
    DATE                       dtValue;
    LONG                       lValue;
    double                     dValue;
    for( int inx=0; inx<numFields; inx++ )
    {
        enumFieldTag fieldID = theMap[inx].m_universalFieldID;
        switch( F1PropType( fieldID ) )
        {
            case eFieldType_Binary:
            {
// to fill properly, 1st name and last name should already be assigned
                CUniversalField emailField;
                string sValue;
                if ( SUCCEEDED(BuildEmailField( pAccessor,
 sValue, emailField )) )
                    univRec.insert( fieldID,
 emailField.getBlob( ) );
                break;
            }
            case eFieldType_String:
                if( pAccessor->GetFieldValue( fieldID, sValue
 ) )
                {
                    if ( 0 == ::_tcslen(sValue.c_str( )) )
                        continue;
                    univRec.insert( fieldID, sValue.c_str( )
 );
                }
                break;
            case eFieldType_DATE:
                if( pAccessor->GetFieldValue( fieldID, dtValue
 ) )
                    univRec.insert( fieldID, dtValue );
                break;
            case eFieldType_DWORD:
                if( pAccessor->GetFieldValue( fieldID, lValue
 ) )
                    univRec.insert( fieldID, lValue );
                break;
            case eFieldType_Double:
                if( pAccessor->GetFieldValue( fieldID, dValue
 ) )
                    univRec.insert( fieldID, dValue );
                break;
        }
    }
}
HRESULT CBaseAOSTableOCI::InsertRecord( MappingItem theMap[ ], int
 numFields, CDataAccessor *pInsertItem, CF1ItemUniversal
 *pUnivItem, bool bForceCreate )
{
    bool bHasData = SetRecordFields( theMap, numFields, pInsertItem,
 pUnivItem );
    if( bHasData || bForceCreate )
    {
        pInsertItem->InsertRow(0);
        pInsertItem->Exec( );
    }
    return S_OK;
}
/*
 * Function: SetRecordFields
 * Description: Map fields from an UniversalRecord format into an
 Oracle database record (pInsertItem)
 */
bool CBaseAOSTableOCI::SetRecordFields( MappingItem theMap[ ], int
 numFields, CDataAccessor *pInsertItem, CF1ItemUniversal *pUnivItem )
{
    bool bHasData = false;
    CUniversalField field;
    for( int inx=0; inx<numFields; inx++ )
    {
        enumFieldTag fieldID = theMap[inx].m_universalFieldID;
        BOOL bExists = pUnivItem->m_record.Find( fieldID, field );
        if( bExists )
        {
            bHasData = true;
            if( field.isBlob( ) )
            {
                string blob = field.getBlob( );
                LPCTSTR szEmailAddr =
 GetAddressFromRecipients((F1RECIPIENTS*)blob.c_str( ) );
                if( szEmailAddr && *szEmailAddr != NULL )
                    pInsertItem->SetFieldValue( fieldID,
 (string) szEmailAddr );
                else
                {
                    bHasData = false;
                    continue;
                }
            }
            else if( field.isString( ) )
            {
                string sValue = field.getString( );
                if( !sValue.empty( ) )
                    pInsertItem->SetFieldValue( fieldID,
 sValue );
            }
            else if( field.isLong( ) )
            {
                LONG nValue = field.getLong( );
                pInsertItem->SetFieldValue( fieldID, nValue );
            }
            else if( field.isDate( ) )
            {
                DATE dValue = field.getDate( );
                if( dValue )
                    pInsertItem->SetFieldValue( fieldID,
 dValue );
            }
        } // if( bExists )
    } // For all fields
    return bHasData;
}
```

While the above-identified code is specific to, for example, an Oracle database, one of average skill in the art will readily recognize that the technique utilized above may be adapted to other types of databases containing records and fields of interest. In the above code examples, all fields which are mapped from a particular application are mapped to fields in the master mapping file.

Management Server

In order to provide security and identification of particular users in an Internet-implemented synchronization system, a management server may be provided in the system of the present invention. The management server is a centralized server which controls behavior and characteristics of the entire network of device engines across all users.

Figure 14:
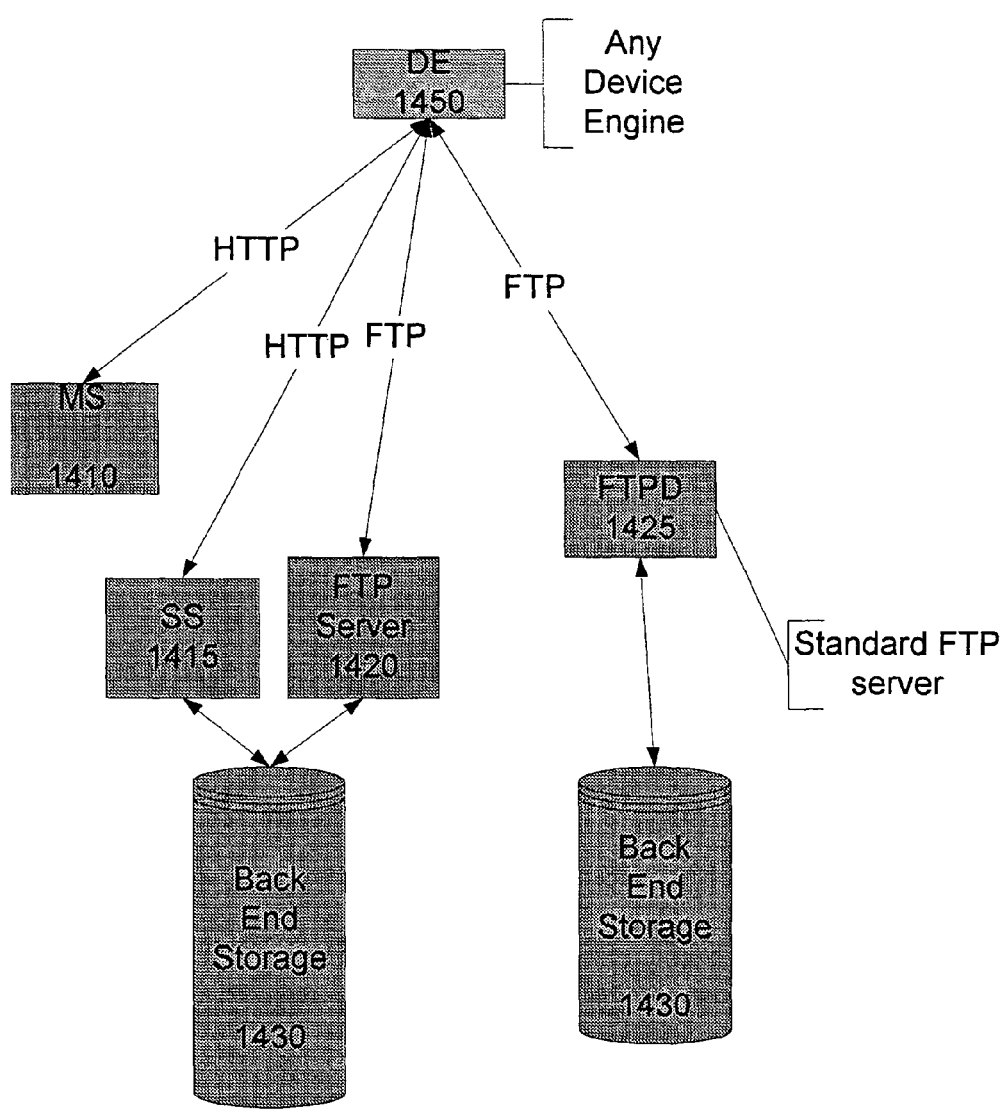
FIG. 14 is a block diagram of a management storage server architecture for used in the system of the present invention.

FIG. 14 shows the general representation of how a management server 1410 integrates itself into the system of the present invention. Shown in FIG. 14 is an exemplary device engine 1450 which has HTTP links to both a management server 1410, a storage server 1415, and a generic FTP server 1420. As will be discussed hereinafter with reference to the process of the present invention, and the specific implementation of the data below shown in FIGS. 15-17, the management server interacts with the device engine to control authorized access to information on the storage server, or a generic FTP server 1420,1425 to access device-specific information storage 1430 in accordance with the system of the present invention. This allows any device coupling to the Internet to have access to management protocols and to retain user information across all platforms which the data which is being synched by the system of the present invention must access.

The management server communicates using hypertext transfer protocol (HTTP) which may be implemented with a secure sockets layer (SSL) to ensure security.

In particular, the management server supports an authentication interface that requires each device engine to authenticate with the management server before performing synchronization. Certain storage server implementations may utilize locking semantics to control read and write access to storage for multiple device engines. For example, in a generic FTP request, if two device engines attempt to connect to the same data at the same time, there must be some form of locking control to prevent device engines accessing the same data at the same time. In this instance, the management server controls the device engine acquisition, renewal, and releasing of locks against data stored in the network.

Each device engine is uniquely identified and tracked by the management server. This allows for tailoring behavior between the management server and specific types of storage systems and device engine components. All device engine components are tagged and version stamped for management via the management server.

Device actions can request updated copies of individual device engine components, permitting self-update and configuration of device engine systems. This permits minimal download designs for device engines that are on low bandwidth connections enabling the device engines to download additional required components at a later time.

In a further aspect of the system, a value added component may be provided where the management server can support client's advertising mechanisms, enabling the display of banner or similar advertising on a device engine system without the need for a web browser. Cycling of advertisements, statistic collection, and the like, are managed via management server protocols. Online purchase and subscription mechanisms are also supported using the management server protocol.

The management server further supports the accounting, sign-up registration, device edition, storage server selection, and similar functions for each user in the system. In one embodiment, the management server may retain password and encryption information for a given user account. In a second embodiment, such information is not retained. The second embodiment provides the advantage that users may feel more secure if the maintainer of the management server is not in possession of the password to access data in the user's account.

Figure 15:
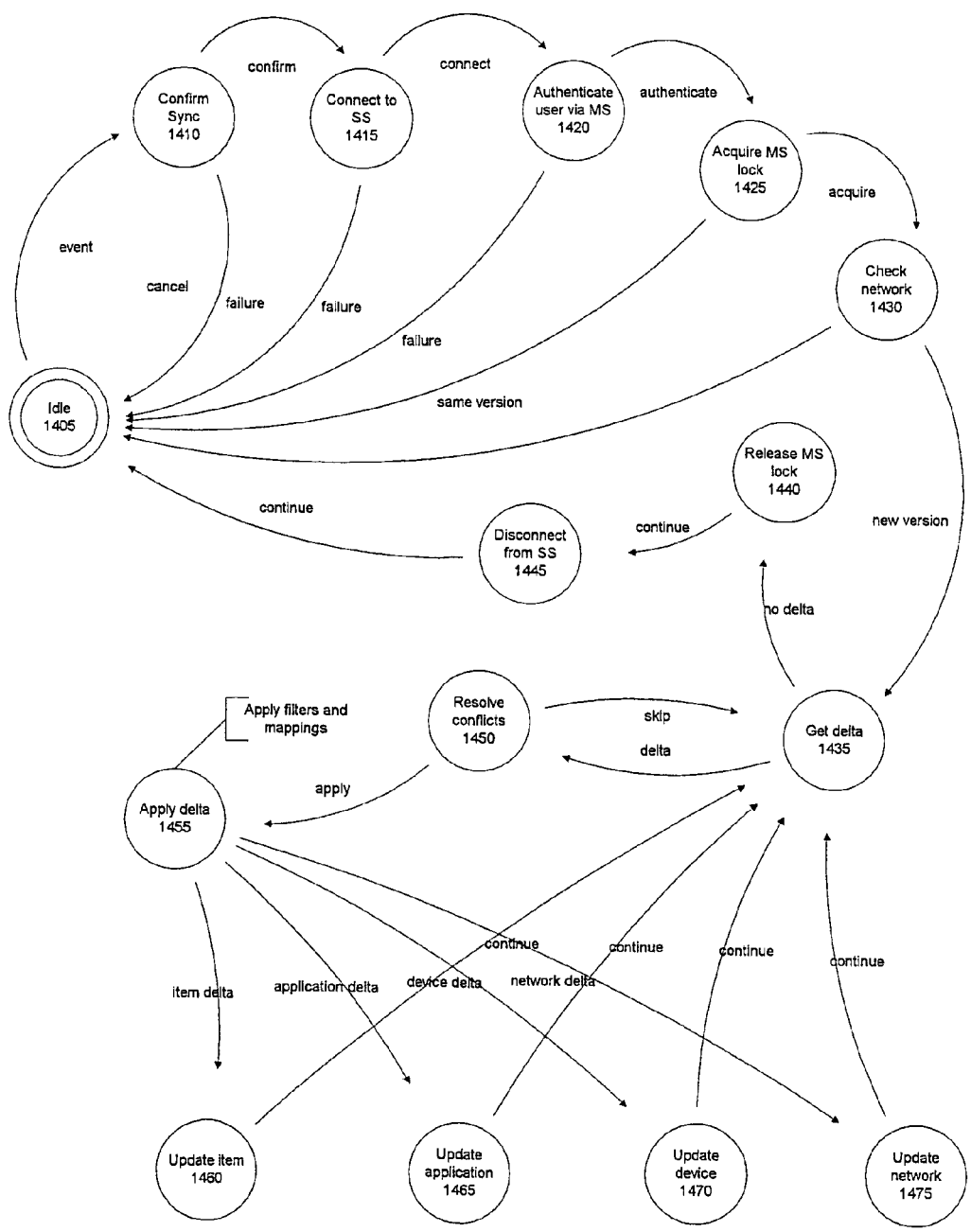
FIG. 15 is a flow diagram illustrating a pull synchronization in accordance with the system of the present invention.
Figure 16:
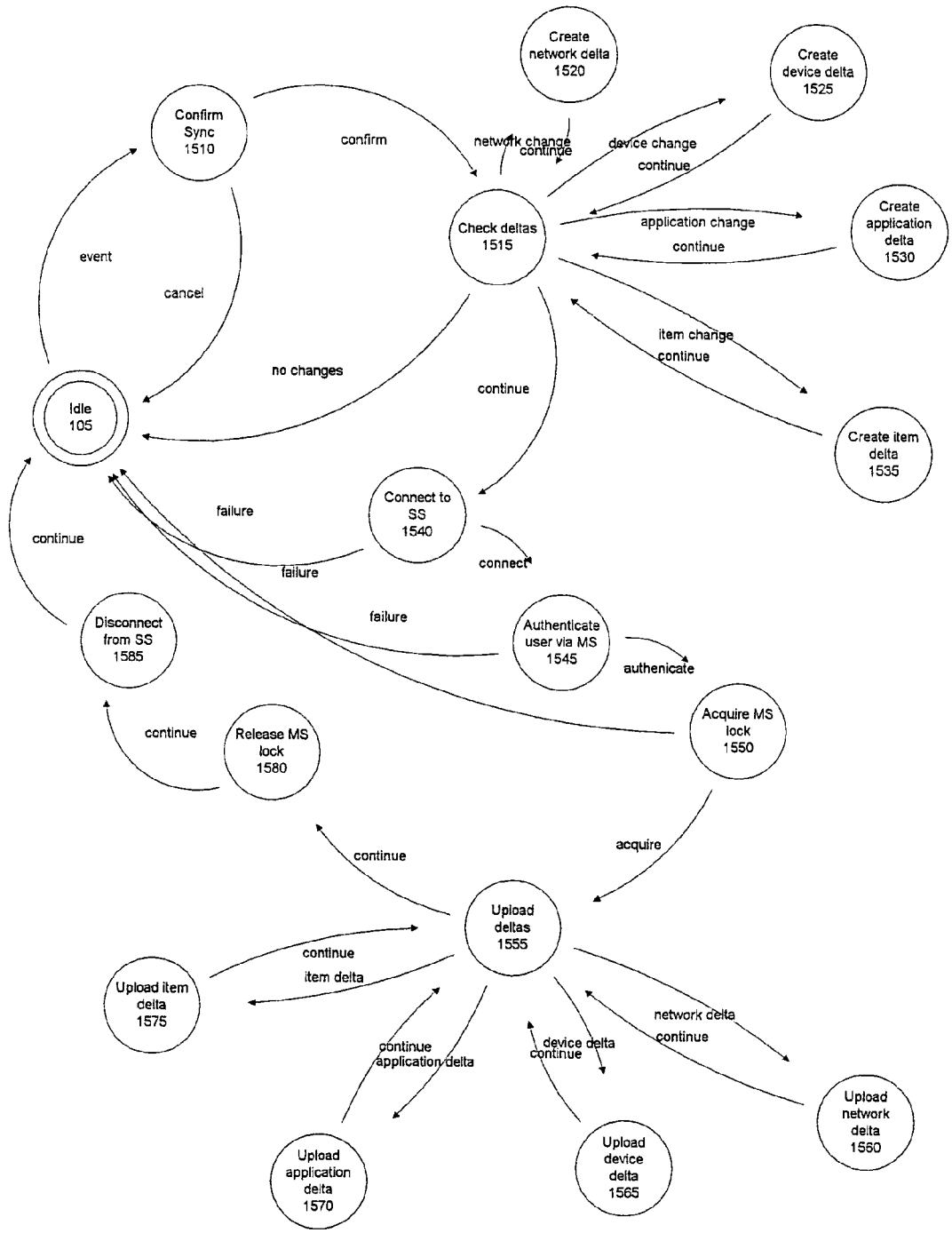
FIG. 16 is a flow diagram illustrating a push synchronization in accordance with the system of the present invention.
Figure 17:
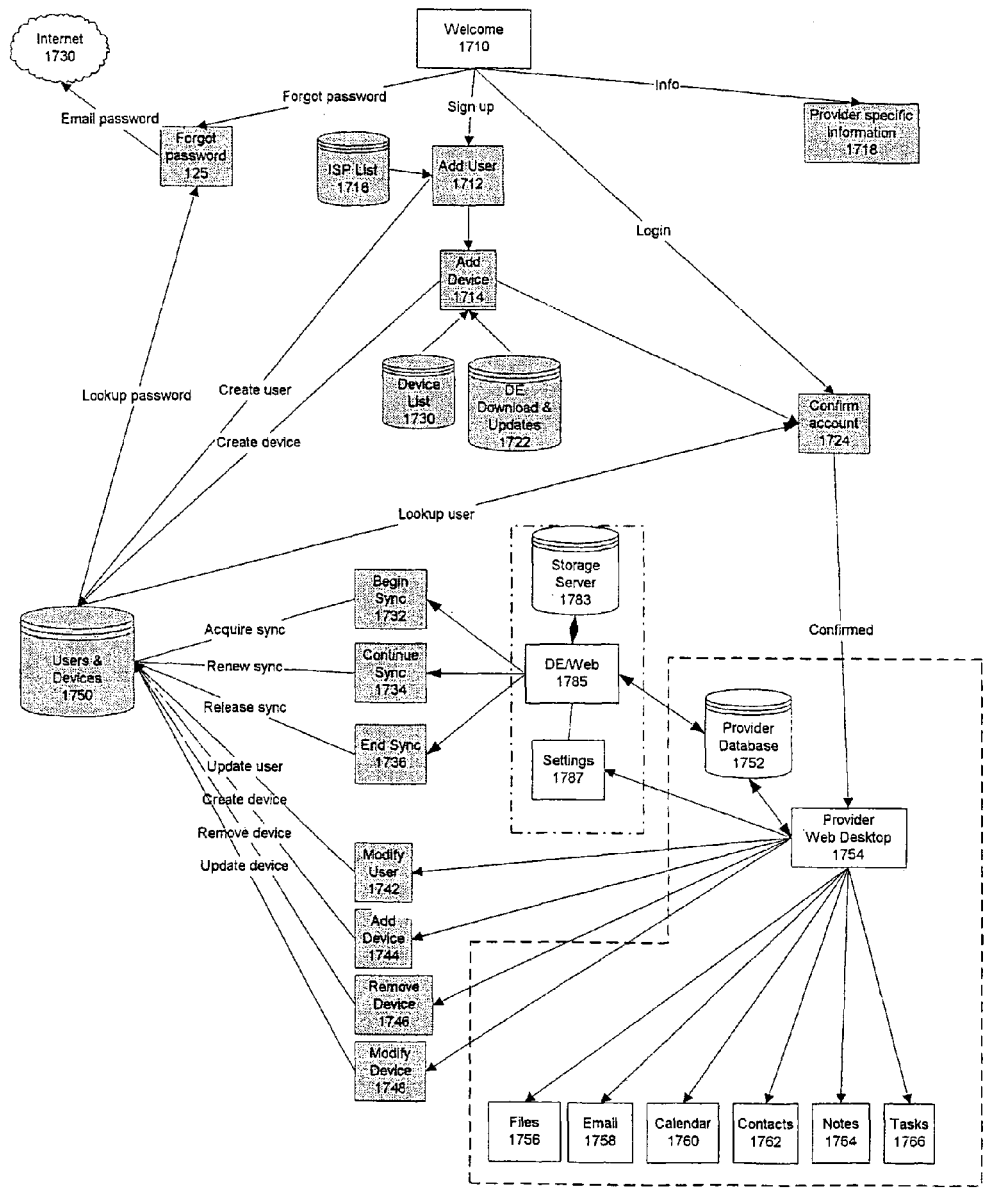
FIG. 17 is a diagram of the management server architecture in accordance with the present invention.

Further information with respect to the management server and the data flow from the management server to other components of the system of the present invention will become apparent with respect to the discussion of the process flow and data flow diagrams in FIGS. 15-17.

FIG. 17 shows a general depiction of the data flow and the functional specification of the management server utilized in accordance with the present invention.

As shown in FIG. 17, following a welcome request 1710, a user is allowed to sign out which enables an add user module 1712, and subsequently enables an add device module 1714. If sign-up is not requested, information may be provided via module 1718.

As indicated in FIG. 17, the add user module 1712 adds user records to the user in device database 1750. Additionally, the add device module 1714 adds users and devices to the user device database 1750. A device list 1720, and a device engine download and update database 1722, provide selection data for the add device module 1714. The account authentication module 1724 receives input both directly from a user log-in from the welcome screen at 1710 and from the add device module 1714.

Once an account is authenticated and confirmed, the administrator of the system of the present invention having a private data store at 1770 may choose to provide a web desktop 1754 which allows access to a user's records such as file 1756, e-mail 1758, calendar 1760, contacts 1762, notes 1764, and tasks 1766. The information will be culled from a provider database 1752 which will be synched in accordance with the system of the present invention as previously described. In essence, the provider database 1752 accesses data from the device engines 1780, which include, as discussed above, the storage server, each individual device engine 1785, and a settings database 1787.

Other portions of the management server include the locking modules for beginning a sync 1732, continuing a sync 1734, and ending a sync 1736, and for updating user information including modifying a user 1742, adding devices 1744, removing devices 1746, and modifying devices 1748.

Storage Server

Shown in FIG. 14 is the storage server 1415. While storage server 1415 may include a generic storage model accessible through any number of standard Internet protocols, in accordance with the present invention, a flexible storage architecture is provided that permits various standard implementations of the system of the present invention. This allows deployment of network services without installation of new server applications and can be responsible for communicating change information between multiple device engines in a consistent fashion.

One or more storage servers 1415 may be used to communicate transaction amongst a collection of devices. Each user's personal information network is represented by a unique account within its own data package storage section. The storage server 1415 maintains persistent store collection of data packages which is, at a minimum, enough data packages to be capable of synchronizing the most out-of-date system in a user's given information network or add information to new devices which are provided in the network. Additional data packages can be maintained to permit rollback of previous versions of information. The storage server can automatically dispose of older data package storage and can support aging of an inactive accounts.

Each storage server 1415 may be implemented using a variety of implementations including a standard FTP server for any operating system platform. The storage server can be implemented using HTTP protocols for increased efficiency and firewall avoidance. The storage server may be implemented using techniques for local storage such as database access or single file storage of a user's entire file system tree. The storage server 1415 may utilize the stored foreign protocol model for moving copies of data packages to other storage servers in the system. In one embodiment, the storage server can allow tunneling of information using an alternative protocol to other storage servers in cases where firewall prevents originating protocol. For example, a storage server can relay an FTP traffic inside an HTTP protocol. Storage servers may include their own locking semantics to arbitrate multiple device engine access to the same server without the need for a separate management server. Each device engine can access only a specific user's data package storage area even though the storage server 1415 may maintain a larger number of data packages across a large number of users. This allows for increased scaling when the storage server is implemented using file system techniques.

In one aspect, the storage server is implemented using standard FTP or HTTP connections for each operation. HTTP is composed of request response pairs. All requests are supposed to be posting commands. Parameters can be set in the form known as "application/X-WWW-form-URLEN-CODED". The encoding is specified as in RFC1866. Functions for the storage server include testing if the storage server can reach other users which will retrieve a simple text string, a "get" command which transfers the contents of a file as in a binary stream of byes; a put command as a binary stream of data to the storage server, a directory listing command, a remove command, a rename command, an exist command, and the like.

Pull Synchronization

FIG. 15 represents a "pull" synchronization process in accordance with the present invention. Both the pull synchronization illustrated in FIG. 15 and the push synchronization illustrated in FIG. 16 are done from the perspective of the device engine.

A pull synchronization as illustrated in FIG. 15 is always performed prior to a push synchronization. This allows the device engine to know whether synchronization of its own data is necessary.

Each device has its own triggering mechanism for initiating synchronization. Some devices, such as Windows clients and Palm® pilots are triggered manually when the user presses a "sync" button. Other devices, such as a cellular telephone, may be triggered automatically after another device completes a sync. Regular, time-based triggers are supported as well. A web-based application portal will sync when a user logs into the website security authorization mechanism, and may optionally sync on a log-out of the user or on the session time-out, but only if the user has changed data during the session.

For each sync, the triggering event specifies which application types are to sync for the device. This enables a triggering event to trigger only a sync for a particular application type. The management server can specify that no sync is needed for a particular type of application to minimize traffic to the storage server. Syncs may be triggered via an HTTP request to the server. This request holds information about which device to sync and the user log-in information is bounced to the management server for authorization and validation. Syncs may be triggered by sending an HTTP request to the server and passing the authentication information in the data portion of the request to the management server. Each device may include a servlet that is responsible for retrieving the request and ensuring its proper format before passing the synchronization request on to the server.

The device name and device class uniquely identify a particular device type that is being synchronized, and is contained in the management server. Each user has one or more device entries in the management server authorization records and each device name is unique for this user's space. For example, if a user has five devices with his or her own personal identification number, there will be five authorization records. There may be two Windows devices, two different Palm® devices and a web service portal, each having their own personal identification number.

As shown in FIG. 15, the pull synchronization process starts at an idle state 1405 when the triggering event, described above, triggers a synchronization request. The synchronization request is confirmed at 1410 and if the request is verified, a connection is made to the storage server at step 1415. Once a connection is established, the connection to the management server is made at step 1420 to authenticate the user identification via the management server. If authentication is successful, the management server may initiate a management server lock on the storage server so that no conflicting device engines may couple to the same data at the same time. A failure at any of the steps 1410-1425 will return the system to its idle state 1405. Once the engine server lock is acquired, the storage server will be checked to determine whether a new version of the data exists on the storage server at step 1430. If no new version exists, the synchronization process ends.

If a new version of the data exists, the device engine will retrieve the difference information at step 1435. "to get Δ."

Once a Δ is retrieved, conflicts are resolved at step 1450. The resolve conflicts step allows a user to resolve conflicts to multiple types of data which have been changed on both the server portion of the device and in the local data.

Once the conflicts have been resolved at step 1450, the Δ's are applied at step 1455. The apply Δ step 1455 allows for filters and mappings to be accounted for on the local device engine side of the system. As shown at steps 1460, 1465, 1470, and 1475, the Δ may include updates at the item level 1460, application level 1465, device level 1470, or network level 1475. In each of the aforementioned steps, a loop back to the Δ retrieval step 1435 is provided. When no further Δ's are available, the management server lock is released at step 1440.

The foregoing description of a pull synchronization is further described in the following pseudo-code:

```
*SymbolicSyncEngine::Sync
   Download Remote File System
   For each Symbolic app in the file system's list of symbolic apps
      CFDESymbolicSyncEngine::SyncSymbolicApp
         Create a structured delta object -- CStructuredDelta
delta(...)
         Compare local and remote versions of deltas SODs),
         if not the same then
            while localVersion != remoteVersion
               download remote version
               // apply delta (change log)
               delta.ApplyChangeLog
               // See details below
               increment local version
            end while
         else
            nothing to do
         end if
         if any local items (change logs) are unsent then
            delta->ApplyUnsentItems (Reads the changes
[JCL where applied?]
         end if
         // Generate a new change log for the device:
         delta->delta.GenerateChangeLog(... strChangeLogFile
...)                                    // See details below
         FTP it back up to Storage Server
         Update the local version number
      end // SymbolicSyncEngine::SyncSymbolicApp
end // CFDESymbolicSyncEngine::Sync
CStructuredDelta::ApplyChangeLog
   Set up m_pAppObj;          // IFAO pointer
   Set up m_pAOS;             // IAOS pointer
```

-continued

```
Other set up (statistics, time to complete, etc.)
Read the change log and ...
ApplyChangeListToAOS(f1Changes)
    for each itme in list
        ApplyItemToAOS // (Does
m_pAOS...AddRecord/UpdateRecord/DeleteRecord)
    end for
end // ApplyChangeListToAOS
If not doing a full sync, also add changes from this file to
apply these to m_F1Changes
end //CStructuredDelta::ApplyChangeLog
CStructuredDelta::GenerateChangeLog
    Set up m_pAppObj;            // IFAO pointer
    Set up m_pAOS;               // IAOS pointer
    Other set up (statistics, time to complete, etc.)
    // Set up m_deviceChanges by call to:
    CStructuredDelta::CreateDeviceChangeList
        Create a CF1Item* pItem
        // Iterate FAO modifications:
        for (m_pAppObj->GetFirstModified(pItem),
m_pAppObj->GetNextModified(pItem))
            cast pItem to --> CF1ItemUniversal* pUniItem
            // Do certain things based on whether the operation
is an add, delete, or update.
            // Then in each case, call:
                CStructuredDelta::GetMatchingItemFromAOS
                    // First get by F1ID
                    m_pAOS->GetRecordByF1ID
                    // See if we have an AppID, if so:
                    m_pAOS->GetRecordByAppID
                    // If we can build search key on it
                        iterate m_pAOS->GetFirstMatchingRecord
/ m_pAOS->GetNextMatchingRecord
                end //
CStructuredDelta::GetMatchingItemFromAOS
        end for
    end // CStructuredDelta::CreateDeviceChangeList
    if m_deviceChanges is not empty
        // reconcile (compare) change lists while writing to AOS
        CStructuredDelta::ReconcileChangeLists
            For each item in m_deviceChanges...
                If we can find it in m_F1Changes
                    Reconcile the device item and the f1
item
                end if
                ApplyItemToAOS // (Does
m_pAOS...AddRecord/UpdateRecord/DeleteRecord)
            end for
        end // CStructuredDelta::ReconcileChangeLists
        // Create a new change log (F1 delta package)
        ApplyChangeListToF1(m_deviceChanges)
            m_deviceChange.Store
            // Fires off its own whole world, see
F1ItemList.cpp
            end // m_deviceChange.Store
        end // ApplyChangeListToF1(m_deviceChanges)
        report stats
    end if
    // Switch (SyncMode)
    If SyncMode == full
        ApplyAOSToDevice
            iterate
m_pAOS->GetFirstRecord...m_pAOS->GetNextRecord
            Add or update the corresponding FAO record.
(Note. Never delete based on what's in AOS, apparently).
        end // ApplyAOSToDevied
    else
        ApplyChangeListToDevice(m_f1Changes);
End // CStructuredDelta::GenerateChangeLog
```

Push Synchronization

FIG. 16 shows a push synchronization in accordance with the system and method of the present invention. Beginning at idle state 1505, a synchronization event occurs and if confirmed at step 1510, Δ's are checked at step 1515. Depending on which type of changes occurred, a network Δ 1520, device Δ 1525, location Δ 1530, or item Δ 1535 will be created.

Once the Δ's for a given application have been created, the method of the present invention continues at step 1540, which enables a connection to a storage server. Upon connection to the storage server, a further connection to management server 1545 will occur to authenticate the user in the system. Failure at any of the aforementioned points will result in returning to idle state 1505. Upon authentication, a management server lock is enabled to ensure that multiple device engines do not connect to the same data at the same time.

Once a lock is acquired at step 1555, Δ's are uploaded to the system. As shown, this may include uploading an item Δ 1575, an application Δ 1570, uploading a device Δ 1565, or a network Δ 1560. Once Δ's have been uploaded to the server, management lock server 1580 is released, and the connection to the storage server is terminated at step 1585.

It should be recognized that such a push synchronization need not occur directly to a server, but may occur directly to a second device engine in accordance with the depiction of the multiple embodiments of the invention in FIGS. 1-7.

Data Package Specification

Once information is provided into the universal data format, the device engine organizes the format into a data package. Each data package thus includes a description of changes to any and all information for particular application, and a collection of data packages describes changes across all device engines including all different types of data. With encoding and compression, data packages can become very compact to minimize bandwidth and storage requirements across the system of the present invention.

In one particular aspect of the present invention, encoding of the data packages may be provided in a streaming format to allow processing by the device engines with minimal storage and memory configuration at the device engine level.

The device engine can read the stream and determine which records from which applications it needs to update the particular information present on the system on which it resides.

Data packages can be provided in a binary data format. This allows data packages to encode changes to non-application data at a bite level. Hence, if a single bit on a system changes, the system of the present invention allows synchronization of that bit on another system. Changes are described as a sequence of bite-level change operations. One such encoding is using a sequence of insert and copy operations. Insert and copy operations generally define a particular "insertion" of a number of bites from a source file, then how many bites of a changed source file must be inserted to a particular file, then how many bites to insert from a particular new file, with a differencing engine taking the bites in the stream and inserting them into the new file to create the new version of the file.

As will be readily understood by one of average skill in the art, this allows a user to, for example, change a binary file such as a word processing document or other type of attachment, and synchronize such an attachment at the binary level. Specifically, if one forwards an e-mail of a word document to a second individual, the second individual modifies it and wishes to return this document with modifications to the first individual, because the first individual has the original file on his system, if both systems are enabled in the system of the present invention, the second system need only send the changes or the difference information back to the first system in order for the first system to reconstruct the document on the second system using this change data to create the document as intended by the second user.

Multiple caching of both the generation and application of data packages can be utilized to deal with communication issues in accordance with the system of the present invention. It should be further recognized that data packages can be merged into larger meta-data packages. Such meta-data information, such as the organization of multiple device packages, may be encoded into a larger system package. Each system package is essentially an encoded sequence of data packages.

Figure 12:
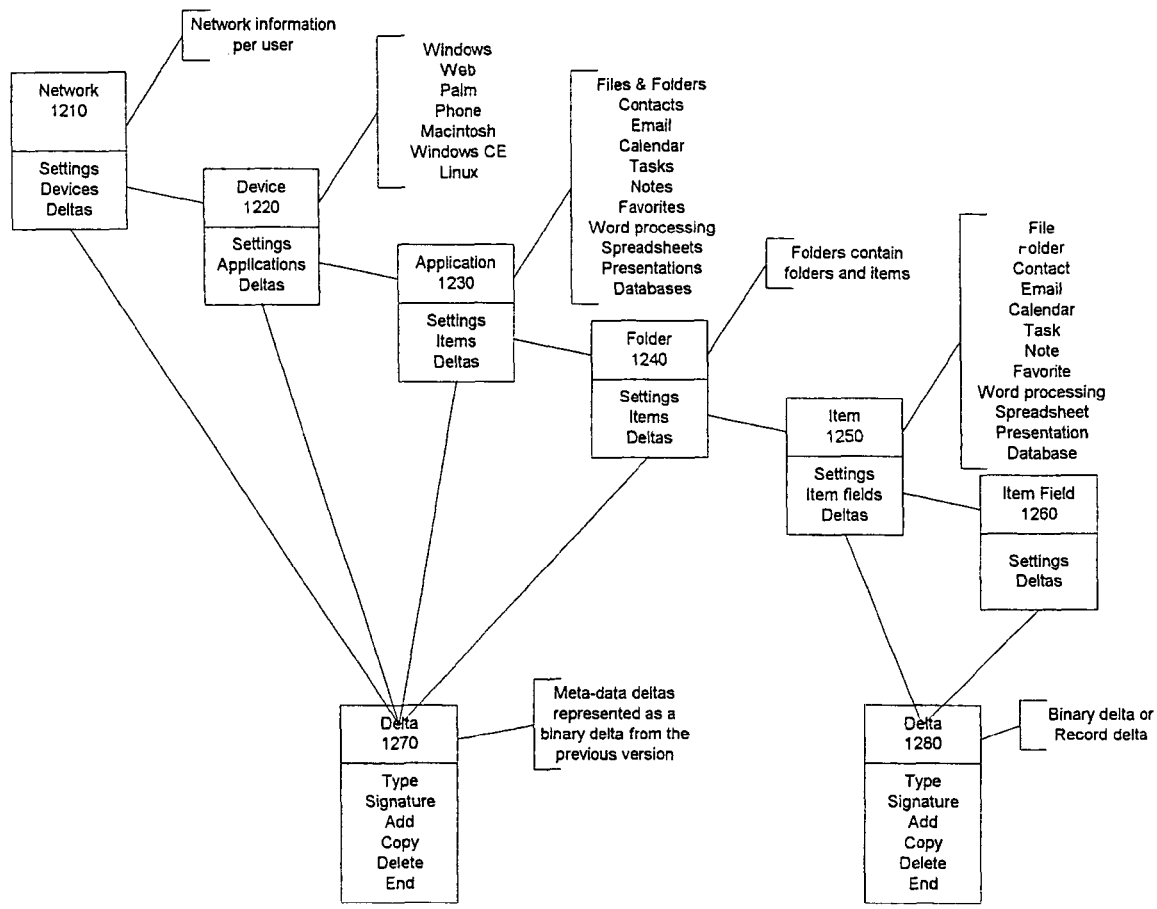
FIG. 12 is a diagram of storage object hierarchy of a universal data format utilized with the system of the present invention.
Figure 13:
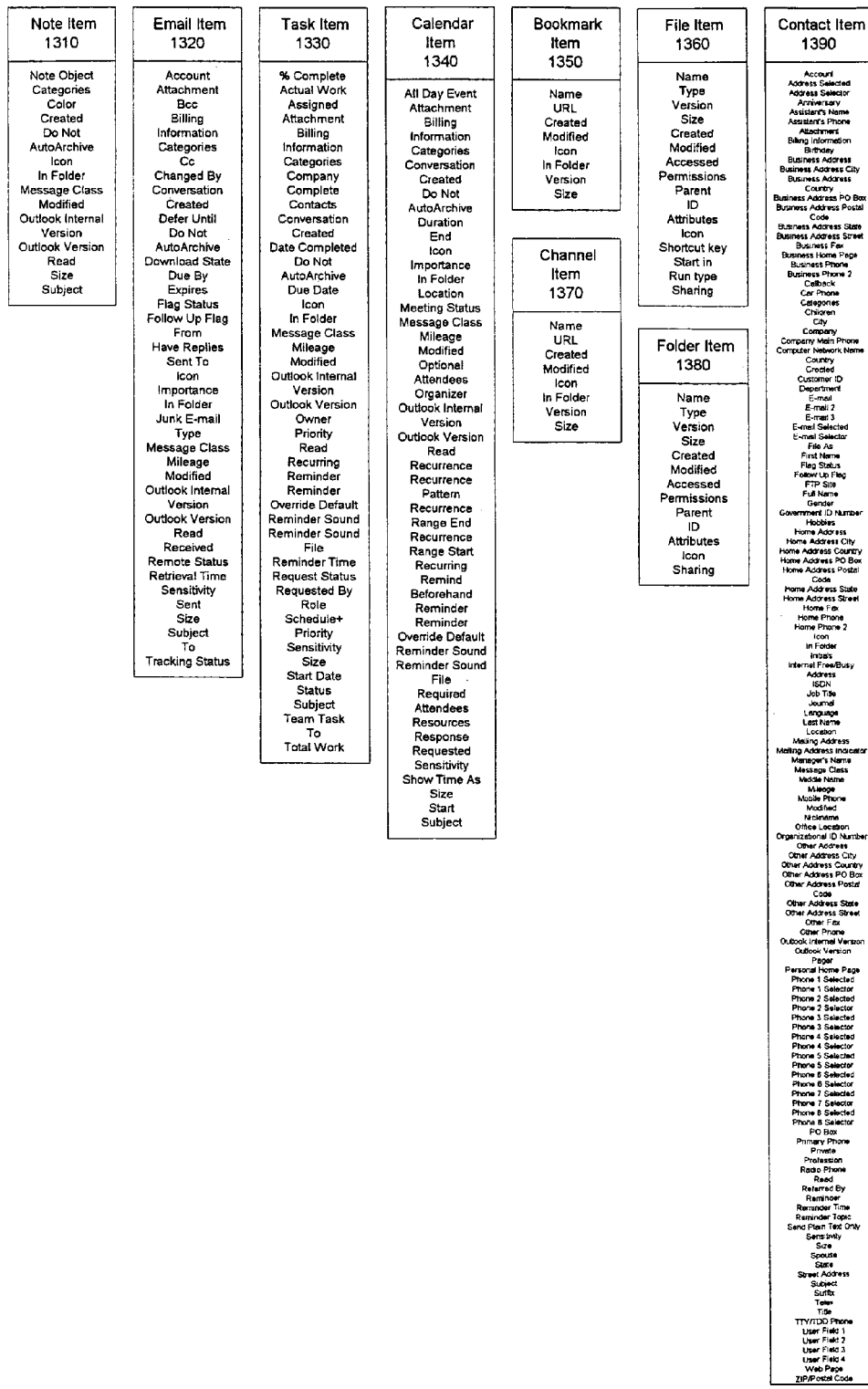
FIG. 13 is a listing of exemplary item objects used in accordance with the routines of the present invention.

FIG. 12 shows the general format of the data package and universal data format an object stream hierarchy used in accordance with the present invention. With reference to FIGS. 11 and 12, one will note that each item in a particular application data structure will have a particular classification, such as a file, folder, contact, e-mail, calendar, etc. as shown in FIG. 13. The universal data structure contains a mapped item field for each type of data possible from each application supported by the system. Hence a "master" list of every data field mapping possible will contain a large number of items. Each application object requires a subset of such fields. One exception is an application object used for a Web portal application which provides access to all information available on all devices, including other Web portals.

Particular examples of item fields 1260 which may be included for any given item 1250 are shown in FIG. 13. These exemplary item objects may, for example, be from an allocation such as Microsoft Outlook. Outlook allows for note items 1310, e-mail items 1320, task items 1330, calendar items 1340, bookmark items 1350, file items 1360, channel items 1370, folder items 1380, and contact items 1390, all of which have fields such as those represented in FIG. 13.

The data format also contains folder information 1240 which allows the classification of items and consequently their associated item fields into particular categories.

Application objects 1230 include information on the types of applications from which information in the stream is included. Device objects 1220 include information on the origin type of device which the information is originating from. Network objects 1210 include information on a user level to define that the information in the data stream is coming from a particular user.

As detailed above, each application object supports a folder store interface that permits management of collections of information on a folder level, and permits management of folder hierarchies of information. The application object also includes an item interface that permits management of individual information entries such as records or files or components of information entries such as fields within records. Each application object further supports an interface for detection of a vendor application.

A DataPack essentially contains a sequence of transactions describing changes to information. This information can span two basic types: structured or application data, and unstructured or binary file data.

Transactions are encoded using an efficient streaming format with tags to represent the actual content objects. This technique permits the continuous extension of the DataPack format as new content is supported.

The general architecture of the package provides for transactions, application data, file data, files, objects and identifiers to be carried in the data package. Generally, transactions, application data, file data, and files have previously been described.

The first portion of the data package will be the data package identifier. Each transaction has a basic architecture of objects and operations. Each piece of content is referred to as an object and is uniquely represented with a Universally Unique Identifier (UUID). Objects typically are represented by a dynamically generated UUID, but more common objects are represented by static UUIDs. The following static UUIDs are defined:

UUID_GenericDefaultFolder
UUID_DefaultContactFolder
UUID_DefaultInboxFolder
UUID_DefaultOutboxFolder
UUID_DefaultDraftsFolder
UUID_DefaultTrashFolder
UUID_DefaultSentFolder
UUID_DefaultCalendarFolder
UUID_DefaultTaskFolder
UUID_DefaultNoteFolder
UUID_DefaultJournalFolder
UUID_DefaultFavoriteFolder
UUID_DefaultCookieFolder
UUID_DefaultHistoryFolder
UUID_DefaultChannelFolder
UUID_DefaultFileFolder
UUID_DefaultCallFolder Each UUID has a unique 128 bit value which may be assigned by the system provider.

Transactions are broken down into manageable blocks in the form of individual files. These files are then optionally compressed and encrypted and prefixed with appropriate headers. Transactions are grouped into specific files based on the following rules:

Transactions related to account information are grouped into a DataPack file.

Transactions related to a specific data class are grouped into a DataPack file.

Transactions referring to binary data are grouped into separate DataPack files for each file object.

A DataPack file is identified using specific rules based on the file name. The file name is of the form "UUID.VER" where UUID is the identifier for the specific object and VER is the transaction version number. The version number is of the form "D0001" with additional digits used for large version numbers. The "D000" value may be reserved for the base version for the object.

The UUID for the user account is generated by the Management Server (MS). The MS also maintains a current table of UUID values and version numbers that provides the root structure for understanding the DataPack files within a user account. The MS also provides necessary locking semantics needed to maintain consistency when multiple device engines attempt to synchronize.

All DataPacks are prefixed with a standardized header that provides basic content information regarding the DataPack. Compression and encryption headers follow the DataPack header if needed.

The data package header information will include version signature, applied versioning information, content type, Δ engine type, compression type, encryption type, applied size, encrypted size, compressed size, raw data size, and other data useful for the device engine in decrypting the data stream to provide the data into a format usable for the application.

The header may optimally have the format:

| Type | Bytes |
| --- | --- |
| Version | 4 |
| Signature | 4 |

| Type | Bytes |
| --- | --- |
| AppliedVersion | 8 |
| ContentType | 4 |
| DeltaType | 4 |
| CompressionType | 4 |
| EncryptionType | 4 |
| AppliedSize | 4 |
| EncryptedSize | 4 |
| CompressedSize | 4 |
| RawSize | 4 |
| Reserved | TBD |

The following ContentType values are permissible:

| Field | Comment |
| --- | --- |
| DP_CONTENT_RAW | Raw |
| DP_CONTENT_COMPRESSED | Compressed |
| DP_CONTENT_ENCRYPTED | Encrypted |

The DeltaType encodes the type of binary file differencing used. The following DeltaType values are permissible using DataPackageDeltaType:

| Field | Comment |
| --- | --- |
| PackageDeltaTypeUninitialized | Uninitialized |
| PackageDeltaTypeRawData | Raw binary data |
| PackageDeltaTypeDeltaXDelta | Xdelta binary difference |
| PackageDeltaTypeDeltaBDiff | Bdiff binary difference |

The compression type specifies whether the DataPack has been compressed. A DataPack compression header follows the DataPack header if a compression type is specified. The following CompressionType values are permissible using DataPackageCompressionType:

| Field | Comment |
| --- | --- |
| PackageCompressionTypeUninitialized | Uninitialized |
| PackageCompressionTypeNone | None |
| PackageCompressionTypePK | PKZip format |
| PackageCompressionTypeLZS | LZS format |

The encryption type specifies whether the DataPack has been encrypted. A DataPack encryption header follows the DataPack header if an encryption type is specified. The following EncryptionType values are permissible using DataPackageEncryptionType:

| Field | Comment |
| --- | --- |
| PackageEncryptionTypeUninitialized | Uninitialized |
| PackageEncryptionTypeNone | None |
| PackageEncryptionTypeXORTest | XOR masked data |
| PackageEncryptionTypeBlowFish | Blowfish |
| PackageEncryptionTypeTwoFish | Twofish |

All DataPack compression headers are encoded using the following format:

| Field | Size (bytes) | Comment |
| --- | --- | --- |
| Size | 4 | Size of data including this header |
| Version | 4 | Version (1) |
| Signature | 4 | Signature (4271) |
| HeaderType | 4 | Header type (HeaderTypeCompression) |
| Reserved | 12 | Reserved |
| DecompressedSize | 4 | Decompressed size |
| Reserved | 50 | Reserved |
| Reserved | 12 | Reserved |

The following HeaderType values are permissible using DataPackageHeaderType:

| Field | Comment |
| --- | --- |
| HeaderTypeUninitialized | Uninitialized |
| HeaderTypeEncryption | Encryption header |
| HeaderTypeCompression | Compression header |
| HeaderTypeRaw | Raw header |

All DataPack encryption headers are encoded using the following format:

| Field | Size (bytes) | Comment |
| --- | --- | --- |
| Size | 4 | Size of data including this header |
| Version | 4 | Version (6) |
| Signature | 4 | Signature (4270) |
| HeaderType | 4 | Header type (HeaderTypeEncryption) |
| Reserved | 12 | Reserved |
| DecryptedSize | 4 | Decrypted size |
| InitValue | 16 | TBD |
| KeyLength | 4 | TBD |
| ClearTextKeyBits | 4 | TBD |
| Salt | 4 | TBD |
| PadBytes | 4 | TBD |
| HMAC | 20 | TBD |
| Reserved | 12 | Reserved |

The data package transaction format may take a number of forms. One example is the following:
DataPack transaction format-header-info-objects and operations Diagram
    transaction::=fileData|Header+InfoList+TransactionList
    fileData::=raw binary file data|binary difference data
    Header::=ID+DataPackID+DataPackVersion
    ID::=FUSE
    DataPackID::=CLOG
    InfoList::=FieldList
    TransactionList::=Operation+[ItemInfo+[FieldList]]
    Operation::=see table below
    ItemInfo::=ItemType+ItemFlags+EntryID+ParentEntryID
    ItemType::=same as enumItemType
    ItemFlags::=same as enumF1ItemFlags
    EntryID::=UUID
    ParentEntryID::=UUID
    UUID::=128-bit UUID as defined by standard
    FieldList::={FieldTag+FieldData}+ListEnd FieldTag::=same as enumFieldTag
FieldData::=FieldDataType+[FieldDataLen+[FieldData-Data]]
FieldDataType::=see below
FieldDataLen::=length as required by FieldDataType
FieldDataData::=data as required by FieldDataType
ListEnd::=DWORD(0)

The following Operation values are permissible using the Operation class:

| Field | Comment |
|---|---|
| clNop | None |
| clAdd | Add |
| clDelete | Delete |
| clChange | Change |
| clMove | Move |
| clRename | Rename |
| clForceChange | Force change without conflict |

The following FieldDataType values are permissible using clDataType:

| Field | Comment |
|---|---|
| clInvalidType | TBD |
| clString | Unicode String bytes with a 32-bit length prefix |
| clString8 | Unicode String bytes with an 8-bit length prefix |
| clString16 | Unicode String bytes with a 16-bit length prefix |
| clEmpty String | TBD |
| clBlob | 32-bit length followed by a byte stream |
| clBlob8 | 8-bit length followed by a byte stream |
| clBlob16 | 16-bit length followed by a byte stream |
| clEmptyBlob | TBD |
| clByte | 8-bit value |
| clShort | 16-bit value |
| clDword | 32-bit value |
| clQword | 64-bit value |
| clDate | DATE type (double) |
| clDouble | 8 byte real |
| clFloat | 4 byte real |
| clUuid | 16 byte uuid |
| clZero | Zero value |
| clOne | One value |
| clUnspecified | Unspecified value |
| clDefault | Default value |
| clCollection | Collection with 32-bit length |
| clCollection8 | Collection with 8-bit length |
| clCollection 16 | Collection with 16-bit length |
| clEmptyCollection | Collection with no length |

Data package objects are organized into a hierarchy as follows:
Account::=DeviceList+DataClassList
DeviceList::={Device}
DataClassList::={DataClass}+ProviderList
ProviderList::={Provider}+DataStoreList
DataStoreList::={Folder}+ItemList
ItemList::={Item}+FieldList
FieldList::={Field}

An account is the root structure, which identifies information about the user's account. It may have exemplary field tags (eFieldTag_[NAME]) such as Name, Password, UserName and Version. The FieldTag ItemType value is specified as ItemType_PIN using enumItemType.

A device is a system identified as part of an account. Examples include PCs, handhelds, Web sites, and so on. It may have tags (eFieldTag_[Name]) such as: "name" and "type" and item type values (eDevice_[Name]) such as Portal, Palm, Windows, CellPhone.

A data class is a grouping of similar information types. Many data classes may be represented for a particular account. The data class may contain field tags (eFieldTag_[Name]) such as: Name; ItemType; SubType; IsManaged; Provider; Filter and Version.

The following ItemType values are permissible using enumDataClass (eDataClass_[Name]):

| Tag | Description |
|---|---|
| UNKNOWN | Unknown |
| CONTACT | Contact/address book |
| EMAIL | Electronic mail |
| CALENDAR | Calendar |
| TASK | Task/to do |
| NOTE | Note/memo |
| JOURNAL | Journal |
| BROWSER | Web browser favorites, cookies, etc. |
| FILESET | Collection of files |
| PIN | Account information |
| DEVICE | Device information |
| FILEBODY | Contents of file |

A Provider is the application that maintains specific information within a data class. There can be more than one provider for a particular data class. Field tags include: Name, AppObjID, Password, Username and Version. Examples of provider tags permissible for the provider (eProvider[Name]) include: Portal, Palm®, MicrosoftOutlook®, Lotus Organizer, Microsoft Internet Explorer, Microsoft Windows, and so on.

Data stores are the containers for storing information within a provider. There can be more than one data store for a particular provider. Folders represent structural organization of information within a data store. Data stores are not required to support folders. Tags (eFieldTag_[Name]) supported for each data store include: Name, ItemType, IsManaged and OriginalPath. Item types permissible for the data store include: unknown; Folder; MAPI; Database and Store_File.

Folders represent structural organization of information within a data store. Data stores are not required to support folders. A folder is represented by a UUID and may contain any of the following field tags (eFieldTag_[Name]): Name; ItemType; IsManaged; FileAttributes; CreationDate; ModificationDate; AccessDate; SpecialFolderType.

The eFieldTag_ItemType value is specified as eItemType_FOLDER using enumItemType.

Items are individual informational components consisting of the actual user data. They may contain field tags such as: Name, ItemType, IsManaged, and Version.

File items typically have the following additional field tags (eFieldTag_[Name]):
FileAttributes
CreationDate
ModificationDate
AccessDate
FileSize
FileBody
DeltaSize
Hash Item types may take the format (eItemType_[Name]) and may include: extended; folder; attachment; contact; distlist; email; calendar; task; call; note; post; journal; form; script; rule; favorites; subscription; common_favorites; desktop; common_desktop; startmenu; common_startmenu; channels; cookies; programs; common_programs; startup; common_startup; sendto; recent; internet_cache; history;

mapped_drives; printers; docs; doctemplates; fonts; window settings; app_data_folder; app_settings; fileset; pin; device; data_store; file; provider; and data_class; internal.

A field is based on one of a set of base type definitions. All field tag information is encoded using the following format:

| Field | Size (bits) | Comment |
|---|---|---|
| FieldTag | 16 | Unique tag number |
| FieldType | 6 | Field base type |
| FieldSubType | 10 | Field sub-type |

A number of Field types are possible, including: unknown; long; dword; date; string; binary; float; double; collection; uniqueid; qword; uuid; file; invalid. LONG is a four byte value encoded in big-endian format. FieldType DWORD is a four byte value encoded in big-endian format. FieldType String is a sequence of Unicode characters followed by a single NULL byte. Interfaces are provided with an MBCS value. FieldType Binary is a sequence of bytes. FieldType UniqueID is a sequence of bytes as defined by the Universally Unique Identifier (UUID) standard. AO interfaces are provided with a Locally Unique Identifier (LUID) value Field-Type QWORD is an eight byte value encoded in big-endian format. FieldType File is a UUID that references a separate DataPack containing the file body data. AO interfaces are provided with a sequence of Unicode characters followed by a single NULL byte that describes the full path name for the file.

Any number of filed sub types are possible. Each of the sub-types includes all of the possible data types from all of the supported user applications. As should be well understood, the possibilities in the number of sub-types is quite large, and dynamic as each new application supported by the system of the present invention is added. Examples of sub-types include:

| SubField Description | Description |
|---|---|
| Base | No sub-type specified |
| EmailAddress | Email address |
| EmailAddressList | Email address list |
| SearchKey | Search key |
| CategoryList | Category list |
| StringList | String list |
| DistributionList | Distribution list |
| Gender | Gender (enumGender) |
| TimeZone | Time zone (enumTimeZone) |
| Boolean | Boolean (TBD) |
| NonZeroBool | Boolean with non-zero value (enumNonZeroBool) |
| Priority | Priority |
| Sensitivity | Sensitivity (enumSensitivity) |
| Importance | Importance (enumImportance) |
| SelectedMailingAddr | Selected mailing address (enumSelectedMailingAddr) |
| TaskStatus | Task status (enumTaskStatus) |
| FlagStatus | Flag status (enumFlagStatus) |
| RecurrenceType | Recurrence type (enumRecurrenceType) |
| DayOfWeek | Day of week (enumDayOfWeek) |
| DayOfMonth | Day of month (1 through 31) |
| InstanceOfMonth | Instance of month (enumInstanceOfMonth) |
| MonthOfYear | Month of year (enumMonthOfYear) |
| BusyStatus | Busy status (enumBusyStatus) |
| AttachmentType | Attachment type (enumAttachmentType) |
| MailBodyType | Mail body type (enumMailBodyType) |
| RGB | RGB color value |
| ManagedState | Managed state (enumManagedState) |
| FaoId | FAO ID for provider |
| SpecialFolderType | Special folder type (enumSpecialFolderType) |
| ResponseState | Response state (TBD) |
| ResponseStatus | Response status (TBD) |
| JournalStatus | Journal status |
| PageStyle | Page style |
| PageNumberMethod | Page number method |
| DelegationState | Delegation state |
| MeetingStatus | Meeting status |
| MeetingInvitation | Meeting invitation |
| CalendarType | Calendar type |
| DateOnly | Date only |
| TimeOnly | Time only |
| PhoneNumber | Phone number |
| URL | URL |
| FilePath | File path |
| PopMessageID | POP message ID |
| MIMEType | MIME type |
| INVALID | All values must be below this |

The aforementioned invention provides a user-centric model of communication to deliver personal information via network services. This model accommodates devices that are disconnected from the network, such as the Internet, at various times. Personal information can continue to exist locally rather than imposing a server-centric model on existing information.

In accordance with the foregoing, a store and forward information broadcast is utilized. Changes to existing information are replicated to an Internet storage server and changes are then retrieved by other devices on the network at device-specific times. In this manner, direct client communication is accomplished without requiring one-to-one communication. While one communication is supported by the system of the present invention, it need not be required.

Although the present invention has been presented in the form of an Internet store and forward broadcast for the purposes of synchronizing personal information amongst various types of devices, it will be readily recognized that synchronization need not be accomplished as the only application for the aforementioned system. In particular, the system can be utilized to efficiently broadcast changes to information in so-called "push" type information applications where only portions of the data need to be changed on a client application. For example, in a system where information such as changes in a stock price need to be broadcast to a plurality of users, a client application implementing the aforementioned technology can be updated by only changing specific portions of the data in the client application relative to that particular stock price. This can be done using a smaller bandwidth than has previously been determined with other devices.

The many objects and advantages of the present invention will be readily apparent to one of average skill in the art. All such objects and advantages are intended to be within the scope of the invention as defined by the written description and drawings presented herein.

What is claimed is:

1. A data synchronization system for a first system having a plurality of data sources each with a data source format, and a second system having a plurality of data sources each with a data source format; comprising:

a first data synchronizer on the first system transmitting at least one set of difference information to an output;

a second data synchronizer on the second system capable of receiving said at least one set of difference information; and a network for coupling the first file system and the second file system to allow communication between the first file system and the second file system when the first and second file systems are physically remote from each other, wherein each said data synchronizer comprises:
- a data source interface;
- a copy of a previous state of each said data source;
- a source data constructor applying difference information to said copy; and
- a difference information generator.

2. The data synchronization system of claim 1 wherein said difference information is transmitted from said first synchronizer to said second synchronizer in a universal format.

3. The data synchronization system of claim 1 wherein said data synchronizer includes a plurality of difference source interfaces, each corresponding to a data source format.

4. A data synchronization system, comprising:
a server;
a network to which the server is operatively coupled;
a first system having a plurality of data file types;
a differencing synchronizer on the first system extracting a first set of differencing data from the data files on the first system when the data files on the system are changed, outputting the differencing data to the server, and retrieving differencing data from the server and applying it to selected data files on the first system;
at least one second system having a second plurality of data file types; and
a differencing synchronizer on the second system extracting the differencing data from the data files on the second system when the data files on the system are changed, outputting the differencing data to the server via the network, and retrieving the first set of differencing data from the server via the network and applying it to the selected data files on the second system.

5. The system of claim 4 wherein said systems are coupled via the Internet.

6. The data synchronization system of claim 4 wherein said first system is a server and said second system is a device capable of communicating with said server.

7. A method for synchronizing at least a first file and a second file resident on a first and a second systems, respectively, comprising:
(a) determining difference data resulting from changes to a first file on the first system, comprising comparing data from the first file to a copy of a previous state of data from the first file;
(b) transmitting the difference information to a remote second system via a network;
(c) applying the difference information to generate change data for the second file; and
(d) updating the second file on the second system with the difference data.

8. The method of claim 7 wherein said comparing step comprises extracting data from said first file, converting said data to a universal file format, providing said copy of said data in said universal format, and comparing said data and said copy to provide difference data in said universal format.

9. The method of claim 8 wherein said step of applying comprises:
constructing new file data for said second file in said universal data format.

10. The method of claim 9 wherein said step of updating comprises translating said new file data into a format of said second file.

11. The method of claim 9 wherein the network is the Internet.

* * * * *